United States Patent [19]

Johnson et al.

[11] Patent Number: 5,553,094
[45] Date of Patent: Sep. 3, 1996

[54] RADIO COMMUNICATION NETWORK FOR REMOTE DATA GENERATING STATIONS

[75] Inventors: Dennis F. Johnson; Michael Wiebe; Erwin Holowick; Nathan R. Jacob; Michael F. Murphy; James J. Schellenberg; Michael S. Stasenski, all of Winnipeg, Canada

[73] Assignee: Iris Systems, Inc., Manitoba, Canada

[21] Appl. No.: 271,545

[22] Filed: Jul. 7, 1994

Related U.S. Application Data

[63] Continuation of Ser. No. 124,495, Sep. 22, 1993, abandoned, which is a continuation of Ser. No. 732,183, Jul. 19, 1991, abandoned, which is a continuation-in-part of Ser. No. 480,573, Feb. 15, 1990, Pat. No. 5,056,107.

[51] Int. Cl.$^6$ .............. H04B 1/69; H04B 15/00; G08C 17/00
[52] U.S. Cl. .............. 375/200; 375/206; 324/110; 380/34; 340/637; 340/870.03; 340/870.06; 340/870.11; 340/870.28
[58] Field of Search .............. 375/200–210; 380/34; 324/110; 379/106; 340/551, 552, 637, 825.06, 825.07, 825.15, 825.35, 825.52, 825.54, 870.02, 870.03, 870.11, 870.13, 870.15, 870.18

[56] References Cited

U.S. PATENT DOCUMENTS

| | | | |
|---|---|---|---|
| 1,987,889 | 1/1935 | Beverage et al. | 342/367 |
| 3,114,900 | 12/1963 | Anderson | 340/870.03 |
| 3,705,385 | 12/1972 | Batz | 340/870.02 |
| 3,786,423 | 1/1974 | Martell | 340/870.03 |
| 3,858,212 | 12/1974 | Tompkins et al. | 340/870.02 UX |
| 3,860,872 | 1/1975 | Richardson et al. | 455/135 |
| 4,013,962 | 3/1977 | Beseke et al. | 455/135 |
| 4,040,046 | 8/1977 | Lang et al. | 340/310.06 |
| 4,190,800 | 2/1980 | Kelly, Jr. et al. | 340/310 A |
| 4,337,466 | 6/1982 | Spahn | 340/870.02 X |
| 4,361,851 | 11/1982 | Asip et al. | 358/84 |
| 4,388,690 | 6/1983 | Lumsden | 364/483 |
| 4,495,596 | 1/1985 | Sciulli | 395/575 |
| 4,661,804 | 4/1987 | Abel | 340/539 |
| 4,692,761 | 9/1987 | Robinton | 340/870.02 X |
| 4,707,679 | 11/1987 | Kennon et al. | 340/310 A |
| 4,724,435 | 2/1988 | Moses et al. | 340/870.13 |
| 4,734,680 | 3/1988 | Gehman et al. | 340/539 |
| 4,780,910 | 10/1988 | Huddleston et al. | 359/144 |
| 4,783,623 | 11/1988 | Edwards et al. | 324/156 |
| 4,799,059 | 1/1989 | Grindahl et al. | 340/870.03 |

(List continued on next page.)

FOREIGN PATENT DOCUMENTS

| | | | |
|---|---|---|---|
| 0244384 | 4/1987 | European Pat. Off. | H04Q 9/00 |
| 0263421 | 9/1987 | European Pat. Off. | H04L 11/16 |
| 036342 | 10/1989 | European Pat. Off. | H04Q 7/04 |
| 2205260 | 10/1980 | Germany | H04L 11/06 |
| 2060843 | 4/1981 | Germany | H04L 11/06 |
| 9314585 | 7/1993 | WIPO | H04L 7/00 |

OTHER PUBLICATIONS

Spread Spectrum Systems, By R.C. Dixon; (John Wiley & Sons, Inc., 1984); section 2.3, pp. 42–44.
Andrew S. Tanenbuam, *Computer Networks*, "Satellite Packet Broadcasting", Prentice Hall, 1981 pp. 253–257.
DataBeam, "System Schematic", Jul. 1986.

*Primary Examiner*—Bernarr E. Gregory
*Attorney, Agent, or Firm*—David Newman & Associates, P.C.

[57] ABSTRACT

A wide area communications network communicating data from a plurality of network service modules through a plurality of remote cell nodes and intermediate data terminals to a central data terminal. The wide area communications network collects network data generated by a plurality of physical devices such as gas, water or electricity meters, located within a geographical area. The wide area communications network is a layered network having a hierarchical communications topology. The central data terminal controls network operation. Intelligence exists at all layers of the network, thereby easing the workload of the central data terminal. The intelligence attributed to each module is a function of the application of that module.

159 Claims, 11 Drawing Sheets

U.S. PATENT DOCUMENTS

| | | | |
|---|---|---|---|
| 4,799,062 | 1/1989 | Sanderford, Jr. et al. | 342/450 |
| 4,804,938 | 2/1989 | Rouse et al. | 340/310 A |
| 4,815,106 | 3/1989 | Propp et al. | 375/36 |
| 4,839,642 | 6/1989 | Batz et al. | 340/825.54 |
| 4,952,928 | 8/1990 | Carroll et al. | 340/825.54 |
| 4,958,645 | 9/1990 | Cadell et al. | 128/671 |
| 5,014,213 | 5/1991 | Edwards et al. | 364/483 |
| 5,056,107 | 10/1991 | Johnson et al. | 375/1 |
| 5,086,292 | 2/1992 | Johnson et al. | 340/637 |
| 5,132,968 | 7/1992 | Cephus | 370/94.1 |
| 5,166,664 | 11/1992 | Fish | 340/539 |
| 5,239,575 | 8/1993 | White et al. | 379/107 |
| 5,264,828 | 11/1993 | Meiksin et al. | 340/539 |

Fig. 3

| PREAMBLE | OPENING FRAME | MESSAGE TYPE | MESSAGE IDENT'N | SERVICE MODULE TYPE | MESSAGE NUMBER | SERVICE MODULE ADDRESS | DATA FIELD | ERROR DETECTION | CLOSING FRAME |

Fig. 4

| GROUP | | APPLICATION | |
|---|---|---|---|
| 1. | BILLING | 1.1 | BASIC MONTHLY BILLING (RES./COMMERCIAL) |
| | | 1.2 | TIME OF USE BILLING (RES./COMMERCIAL) |
| | | 1.3 | DEMAND BILLING (RES./COMMERCIAL) |
| | | 1.4 | CONSOLIDATED BILLS FOR MULTI-SITE CUSTOMERS E.G. BILLBOARD OPERATORS (COMMERCIAL) |
| | | 1.5 | PREPAYMENT CUSTOMER SUPPORT (RESIDENTIAL) |
| 2. | SPECIAL READS | 2.1 | CUSTOMER INQUIRIES (1-3 MONTH DAILY CONSUMPTION RECORD AVAILABLE FOR EACH CUSTOMER) |
| | | 2.2 | OPENING ACCOUNTS (CURRENT READING AVAILABLE) |
| | | 2.3 | CLOSING ACCOUNTS (CURRENT READING AVAILABLE) |
| | | 2.4 | REFUND AUTHORIZATION ON PREPAYMENTS |
| 3. | UNAUTHORIZED SERVICE USE | 3.1 | SOURCE OF LOSSES |
| | | 3.2 | METER TAMPER DETECTION AND MONITORING |
| | | 3.3 | REVENUE DIVERSION ESTIMATION |
| 4. | GRID STATUS | 4.1 | DISTRIBUTION GRID OUTAGE (FUSE, RECLOSER, SECTIONALIZER, DISTRIBUTION TRANSFORMER) |
| | | 4.2 | INDIVIDUAL SERVICE LOSS |
| | | 4.3 | RESTORATION NOTIFICATION |
| 5. | SERVICE QUALITY | 5.1 | OUTAGE INFORMATION |
| | | 5.2 | VOLTAGE ON LINES |
| 6. | GRID CONFIGURATION MANAGEMENT | 6.1 | CAPACITOR BANK SWITCHING |
| | | 6.2 | TRANSFORMER LOAD MANAGEMENT |
| | | 6.3 | FEEDER LOAD MANAGEMENT |
| | | 6.4 | SECTIONALIZER CONTROL |
| 7. | LOAD CONTROL | 7.1 | AIR CONDITIONERS |
| | | 7.2 | WATER HEATERS |
| | | 7.3 | POOL PUMPS/HEATERS |
| 8. | SERVICE CONTROL | 8.1 | SERVICE CONNECT |
| | | 8.2 | SERVICE DISCONNECT |
| | | 8.3 | SERVICE LIMITATION |
| 9. | LOAD SURVEY | 9.1 | 15 MINUTE RESOLUTION LOAD SURVEY |
| 10. | SUB-STATION MONITORING SUB-SCADA AND SCADA | 10.1 | TRANSFORMERS (TEMPERATURE, VOLTAGE, DEMAND, ETC.) |
| | | 10.2 | OTHER |
| 11. | LOAD CURTAILMENT MONITORING AND NOTIFICATION | 11.1 | HIGH RESOLUTION READINGS ON DEMAND |
| | | 11.2 | CENTRALIZED CONTROL FOR MULTIPLE-STATE GEOGRAPHIC AREAS |
| | | 11.3 | CUSTOMER NOTIFICATION (CRT, PAGE, RADIO) |

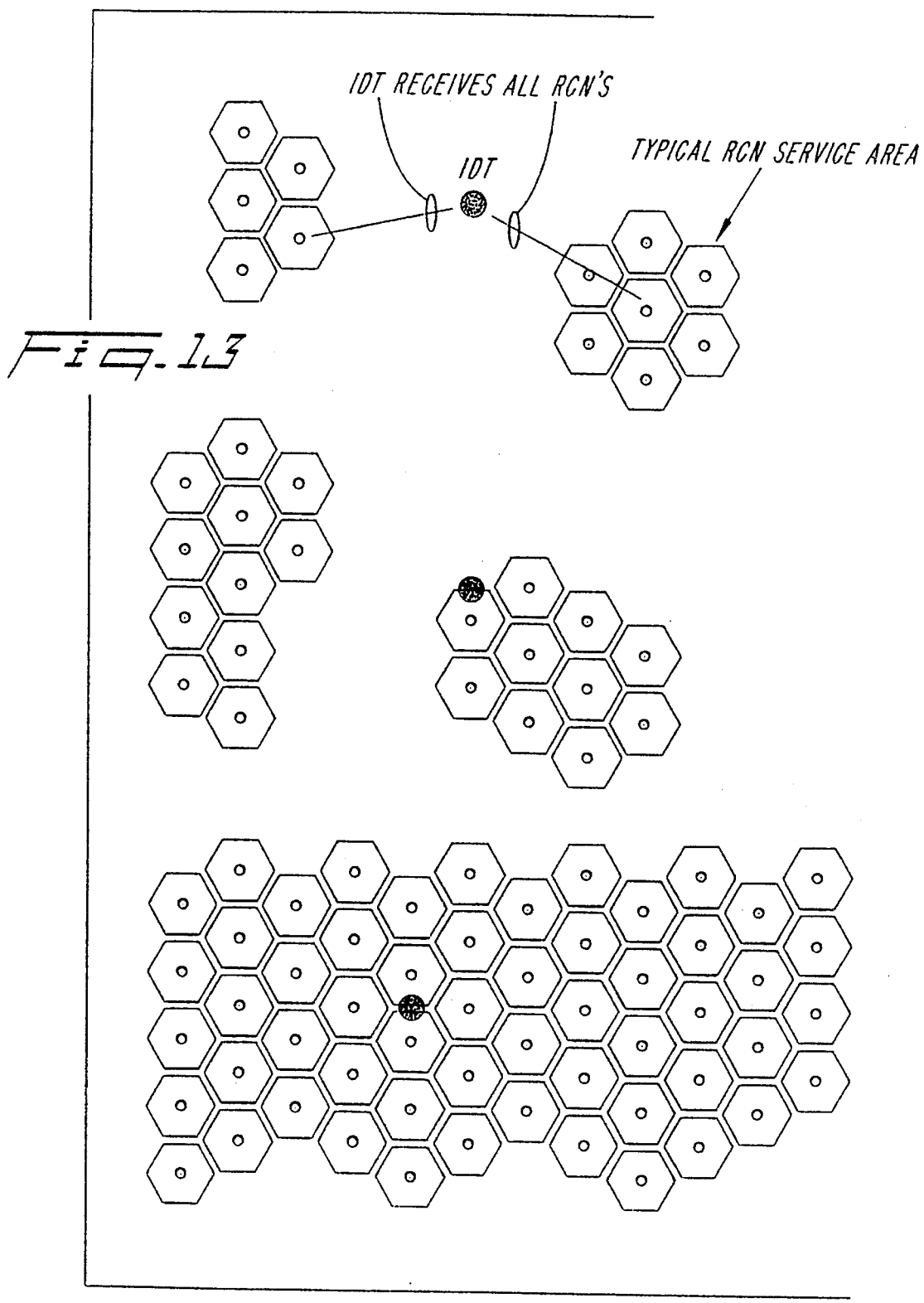

RADIO COMMUNICATION NETWORK FOR REMOTE DATA GENERATING STATIONS

RELATED PATENTS

This patent issued from a file wrapper continuation application of a patent application entitled, RADIO COMMUNICATION NETWORK FOR REMOTE DATA GENERATING STATIONS, having Ser. No. 08/124,495 and filing date Sep. 22, 1993, now abandoned which was a file wrapper continuation application of a patent application entitled, RADIO COMMUNICATION NETWORK FOR REMOTE DATA GENERATING STATIONS, having Ser. No. 07/732,183 and filing date Jul. 19, 1991, now abandoned which was a continuation-in-part application of a patent application entitled, RADIO COMMUNICATION NETWORK FOR REMOTE DATA GENERATING STATIONS, having Ser. No. 07/480,573 and filing date Feb. 15, 1990, now U.S. Pat. No. 5,056,107 issued Oct. 8, 1991. The benefit of the earlier filing date of the parent patent applications is claimed pursuant to 35 U.S.C. §120.

BACKGROUND OF THE INVENTION

This invention relates to a communications network for collecting data from remote data generating stations, and more particularly a radio based system for sending data from a plurality of network service modules, with each network service module attached to a meter, and communicating through remote cell nodes and through intermediate data terminals, to a central data terminal.

DESCRIPTION OF THE RELEVANT ART

Many attempts have been made in recent years to develop an automatic meter reading system for utility meters such as used for electricity, gas and water, which avoids meter reading personnel inspecting and physically note the meter readings. There are of course many reasons for attempting to develop a system of this type.

Most of the prior art systems have achieved little success. The system which has achieved some success or is most widely used has an automatic meter reading unit mounted on an existing meter at the usage site and includes a relatively small transmitter and receiver unit of very short range. The unit is polled on a regular basis by a travelling reading unit which is carried around the various locations on a suitable vehicle. The travelling reading unit polls each automatic meter reading unit in turn to obtain stored data. This approach is of limited value in that it requires transporting the equipment around the various locations and hence only very infrequent, for example monthly, readings can be made. The approach avoids a meter reader person actually entering the premises to physically inspect the meter which is of itself of some value but only limited value.

Alternative proposals in which reading from a central location is carried out have been made but have achieved little success. One proposal involves an arrangement in which communication is carried out using the power transmission line of the electric utility. Communication is, therefore, carried out along the line, with each remote reading unit polled in turn. This device has encountered significant technical difficulties.

Another alternative attempted to use the pre-existing telephone lines for communication. The telephone line proposal has a significant disadvantage since it must involve a number of other parties, in particular the telephone company, for implementing the system. The utility companies are reluctant to use a system which they cannot entirely control and manage themselves.

A yet further system using radio communication has been developed by Data Beam, which was a subsidiary of Connecticut Natural Gas. This arrangement was developed approximately in 1986 and has subsequently received little attention and it is believed that no installations are presently operative. The system includes a meter reading device mounted on the meter with a transmitting antenna which is separate from the meter reading device. The transmitting antenna is located on the building or other part of the installation site which enables the antenna to transmit over a relatively large distance. The system uses a number of receiving units, with each arranged to receive data from a large number of transmitters, in the range 10,000 to 30,000. The transmitters, in order to achieve maximum range, are positioned to some extent directionally or at least on a suitable position of the building to transmit to the intended receiving station. This arrangement leads to using a minimum number of receiving stations for optimum cost efficiency.

The separate transmitter antenna, however, generated significant installation problems due to wiring the antenna through the building to the transmitter and receiver. The anticipated high level of power used for transmitting involved very expensive battery systems or very expensive wiring. The proposal to reduce the excessive cost was to share the transmission unit with several utilities serving the building so that the cost of the transmitter could be spread, for example, between three utilities supplied to the building. Such installation requires separate utility companies to cooperate in the installation. While this might be highly desirable, such cooperation is difficult to achieve on a practical basis.

In order to avoid timing problems, the meter reading units were arranged to communicate on a random time basis. However, the very large number, up to 30,000, of meter reading units reporting to a single receiving station, leads to a very high number of possible collisions between the randomly transmitted signals. The proposed system, with signals reported one or more times daily could therefore lose as many as 20% to 50% of the signals transmitted due to collisions or interference leading to a very low efficiency data communication. The use of transmitters at the meter reading units which are of maximum power requires a larger interference protection radius between systems using the same allocated frequency.

An alternative radio transmission network is known as ALOHA. ALOHA has a number of broadcasting stations communicate with a single receiving station, with the broadcasting stations transmitting at random intervals. In the ALOHA system, collisions occur so that messages are lost. The solution to this problem is to monitor the retransmission of the information from the receiving station so that each broadcasting station is aware when its transmission has been lost. Each broadcasting station is then programmed to retransmit the lost information after a predetermined, generally pseudorandom, period of time. The ALOHA system requires retransmission of the information from the receiving station to take place substantially immediately and requires each broadcasting station to also have a receiving capability.

Cellular telephone networks are implemented on a wide scale. Cellular systems, however, use and allocate different frequencies to different remote stations. While this is acceptable in a high margin use for voice communications, the costs and complications cannot be accepted in the relatively lower margin use for remote station monitoring. The technology of cellular telephones leads to the perception in the art that devices of this type must use different frequency networks.

While theoretically automatic meter reading is highly desirable, it is, of course, highly price sensitive and hence it is most important for any system to be adopted that the price per unit, particularly for the large number of meter reading units, be kept to a minimum. The high cost of high power transmission devices, receiving devices and battery systems generally leads to a per unit cost which is unacceptably high.

OBJECTS OF THE INVENTION

A general object of the invention is a communications network for communicating data from a plurality of network service modules to a central data terminal.

Another object of the invention is a communications network which is suitable for an automatic meter reading system.

A further object of the invention is a communications network for collecting data from remote data generating stations that is simple and economic to install and maintain.

A still further object of the invention is a communications network for collecting data from network service modules that is spectrum efficient, and has inherent communication redundancy to enhance reliability and reduce operating costs.

An additional object of the invention is an open architecture communication network which accommodates new technology, and allows the network operator to serve an arbitrarily large contiguous or non-contiguous geographic area.

SUMMARY OF THE INVENTION

According to the present invention, as embodied and broadly described herein, a wide area communications network is provided for sending data from a plurality of network service modules to a central data terminal. The wide area communications network collects NSM data generated by a plurality of physical devices located within a geographical area. The physical devices may be, for example, a utility meter as used for electricity, gas or water. The wide area communications network comprises a plurality of network service modules, a plurality of remote cell nodes, a plurality of intermediate data terminals, and a central data terminal. Each network service module is coupled to a respective physical device.

The network service module (NSM) includes NSM-receiver means, NSM-transmitter means, NSM-processor means, NSM-memory means and an antenna. The NSM-receiver means, which is optional, receives a command signal at a first carrier frequency or a second carrier frequency. In a preferred mode of operation, the NSM-receiver means receives the command signal on the first carrier frequency for spectrum efficiency. The wide area communications network can operate using only a single carrier frequency, i.e., the first carrier frequency. The command signal allows the oscillator of the NSM-transmitting means to lock onto the frequency of the remote cell node, correcting for drift. Signalling data also may be sent from the remote cell node to the network service module using the command signal.

The NSM-processor means arranges data from the physical device into packets of data, transfers the data to the NSM-memory means, and uses the received command signal for adjusting the first carrier frequency of the NSM transmitter. The NSM data may include meter readings, time of use and other information or status from a plurality of sensors. The NSM-processor means, for all network service modules throughout a geographical area, can be programmed to read all the corresponding utility meters or other devices being serviced by the network service modules. The NSM-processor means also can be programmed to read peak consumption at predetermined intervals, such as every 15 minutes, throughout a time period, such as a day. The NSM-memory means stores NSM data from the physical device. The NSM-processor means can be programmed to track and store maximum and minimum sensor readings or levels throughout the time period, such as a day.

The NSM-transmitter means transmits at the first carrier frequency the respective NSM data from the physical device as an NSM-packet signal. The NSM-packet signal is transmitted at a time which is randomly or pseudorandomly selected within a predetermined time period, i.e., using a one-way-random-access protocol, by the NSM-processor means. The NSM-transmitter includes a synthesizer or equivalent circuitry for controlling its transmitter carrier frequency. The NSM-transmitter means is connected to the antenna for transmitting multi-directionally the NSM-packet signals.

A plurality of remote cell nodes are located within the geographical area and are spaced approximately uniformly and such that each network service module is within a range of several remote cell nodes, and so that each remote cell node can receive NSM-packet signals from a plurality of network service modules. The remote cell nodes preferably are spaced such that each of the network service modules can be receive by at least two remote cell nodes. Each remote cell node (RCN) includes RCN-transmitter means, RCN-receiver means, RCN-memory means, RCN-processor means, and an antenna. The RCN-transmitter means transmits, at the first carrier frequency or the second carrier frequency, the command signal with signalling data. Transmitting a command signal from the RCN-transmitter means is optional, and is employed only if the NSM-receiver means is used at the network service module as previously discussed.

The RCN-receiver means receives at the first carrier frequency a multiplicity of NSM-packet signals transmitted from a multiplicity of network service modules. Each of the NSM-packet signals typically is received at a different point in time, since each was transmitted at a time which was randomly or pseudorandomly selected within the predetermined time period. The multiplicity of network service modules typically is a subset of the plurality of network service modules. The RCN-receiver means also receives polling signals from the intermediate data terminal, and listens or eavesdrops on neighboring remote cell nodes when they are polled by the intermediate data terminal.

The RCN-memory means stores the received multiplicity of NSM-packet signals. The RCN-processor means collates the NSM-packet signals received from the network service modules, identifies duplicate NSM-packet signals and deletes the duplicate NSM-packet signals. When a polling signal is sent from an intermediate data terminal, (IDT) the RCN-transmitter means transmits at the first carrier frequency the stored multiplicity of NSM-packet signals as an RCN-packet signal.

When a first remote cell node is polled with a first polling signal by the intermediate data terminal, neighboring remote cell nodes receive the RCN-packet signal transmitted by the first remote cell node. Upon receiving an acknowledgment signal from the intermediate data terminal, at the neighboring remote cell nodes, the respective RCN-processor means deletes from the respective RCN-memory means messages, i.e. NSM-packet signals, received from the network service modules that have the same message identification number as messages transmitted in the RCN-packet signal from the first remote cell node to the intermediate data terminal.

The plurality of intermediate data terminals are located within the geographic area and are spaced to form a grid overlaying the geographic area. Each intermediate data terminal includes IDT-transmitter means, IDT-memory means, IDT-processor means and IDT-receiver means. The IDT-transmitter means includes a synthesizer or equivalent circuitry for controlling the carrier frequency and allowing the IDT-transmitter means to change carrier frequency. The IDT-transmitter means transmits preferably at the first carrier frequency, or the second carrier frequency, the first polling signal using a first polling-access protocol to the plurality of remote cell nodes. When the first polling signal is received by a remote cell node, that remote cell node responds by sending the RCN-packet signal to the intermediate data terminal which sent the polling signal. If the intermediate data terminal successfully receives the RCN-packet-signal, then the IDT-transmitter means sends an acknowledgment signal to the remote cell node.

The IDT-receiver means receives the RCN-packet signal transmitted at the first carrier frequency from the remote cell node which was polled. Thus, after polling a plurality of remote cell nodes, the IDT-receiver means has received a plurality of RCN-packet signals.

The IDT-memory means stores the received RCN-packet signals. The IDT-processor means collates the NSM-packet signals embedded in the RCN-packet signals received from the plurality of remote cell nodes, identifies duplicates of NSM-packet signals and deletes the duplicate NSM-packet signals, i.e. messages from network service modules that have the same message identification number. In response to a second polling signal from a central data terminal, the IDT-transmitter means transmits a plurality of RCN-packet signals as an IDT-packet signal to the central data terminal.

The central data terminal (CDT) includes CDT-transmitter means, CDT-receiver means, CDT-processor means and CDT-memory means. The CDT-transmitter means transmits sequentially the second polling signal using a second polling access protocol to each of the intermediate data terminals. The CDT-receiver means receives a plurality of IDT-packet signals. The central data terminal, intermediate data terminals and the remote cell nodes may be coupled through radio channels, telephone channels, fiber optic channels, cable channels, or other communications medium. The CDT-processor means decodes the plurality of IDT-packet signals as a plurality of NSM data. The CDT-processor means also identifies duplicates of NSM data and deletes the duplicate NSM data. THE CDT-memory means stores the NSM data in a data base.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 3 is a representative NSM-data packet;

FIG. 4 is a listing or representative applications supported by the communications network;

FIG. 13 illustrates a typical communications network with gradual growth in the number of areas served.

DETAILED DESCRIPTION OF THE PREFERRED EMBODIMENTS

Figure 1:
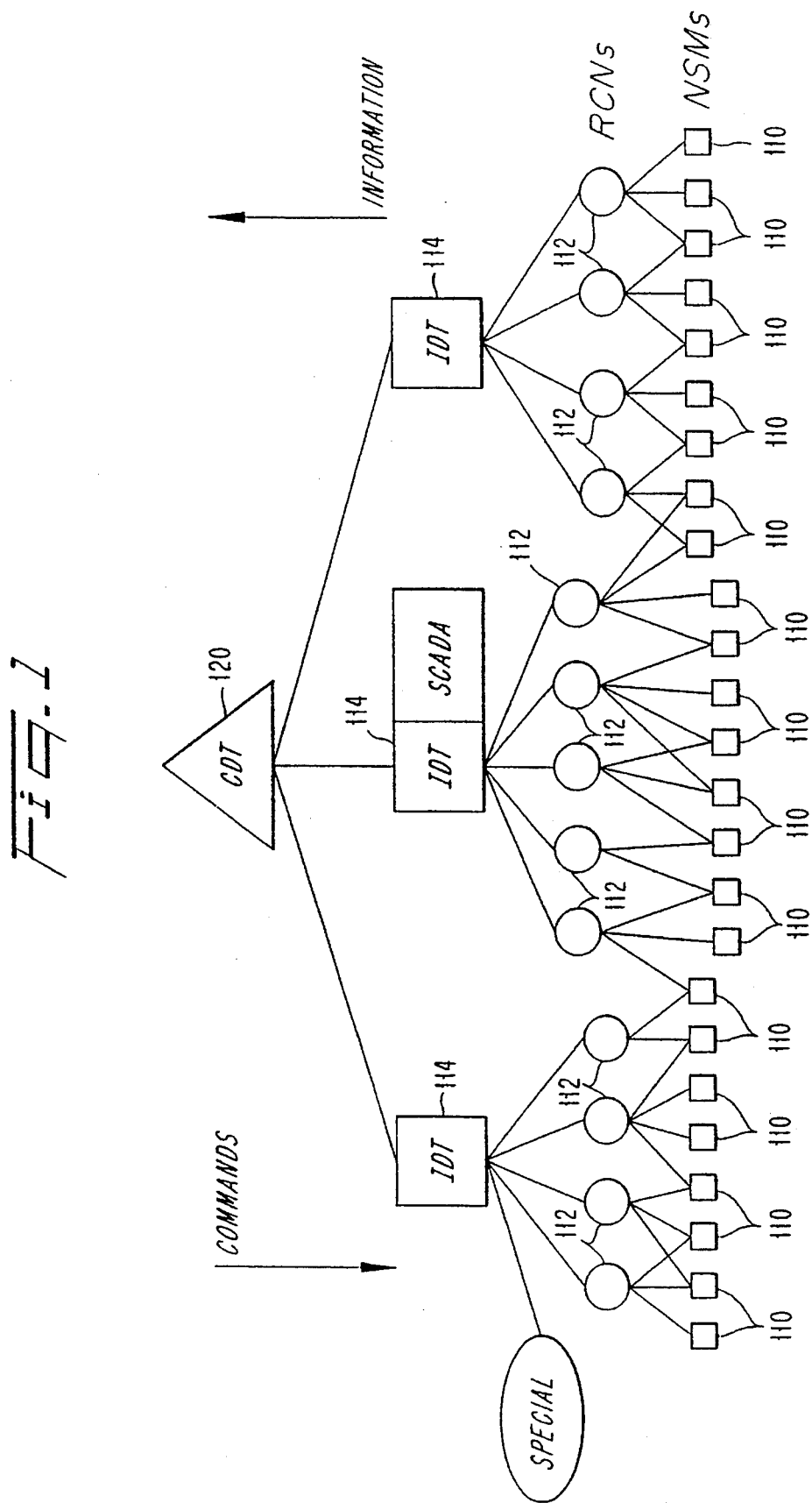
FIG. 1 illustrates the hierarchial communications network topology.

Reference will now be made in detail to the present preferred embodiments of the invention, examples of which are illustrated in the accompanying drawings, wherein like reference numerals indicate like elements throughout the several views.

A wide area communications network communicates data from a plurality of network service modules to a central data terminal. The wide area communications network collects NSM data generated by a plurality of physical devices located within a geographical area. The wide area communications network, as illustratively shown in FIG. 1, is a layered network having a hierarchical communications topology comprising a plurality of network service modules 110, a plurality of remote cell nodes 112, a plurality of intermediate data terminals 114, and a central data terminal 120. The physical devices may be, for example, a utility meter as used for electricity, gas or water.

The central data terminal controls network operation. Intelligence exists at all layers of the network, thereby easing the workload of the central data terminal. The intelligence attributed to each module is a function of the application of that module.

Network Service Module

Information is acquired at the lowest level of the wide area communications network of FIG. 1, and the network service module 110 performs the data acquisition functions. Network service modules 110 include meter service modules for electricity, gas and water, a service disconnect module, a load management module, an alarm monitoring module, or any other module that can be used with the wide area communications network.

The network service modules 110 are linked to the wide area communications network via high frequency radio channels, typically in the 928 MHz–952 MHz band, as well as related frequencies in the 902 MHz–912 MHz and 918

MHz–928 MHz bands. Radio channels in these bands are the preferred communications medium because use of radio communications eliminates the need for physical connections to the service modules which drastically reduces installation costs compared to other communication media such as telephone, cable networks and power line carriers. Also, operation in the high frequency bands permits the use of small antennas so that retrofitting standard watt hour meters is simplified. Radio communication channels in other bands may work equally as well, however.

Figure 2:
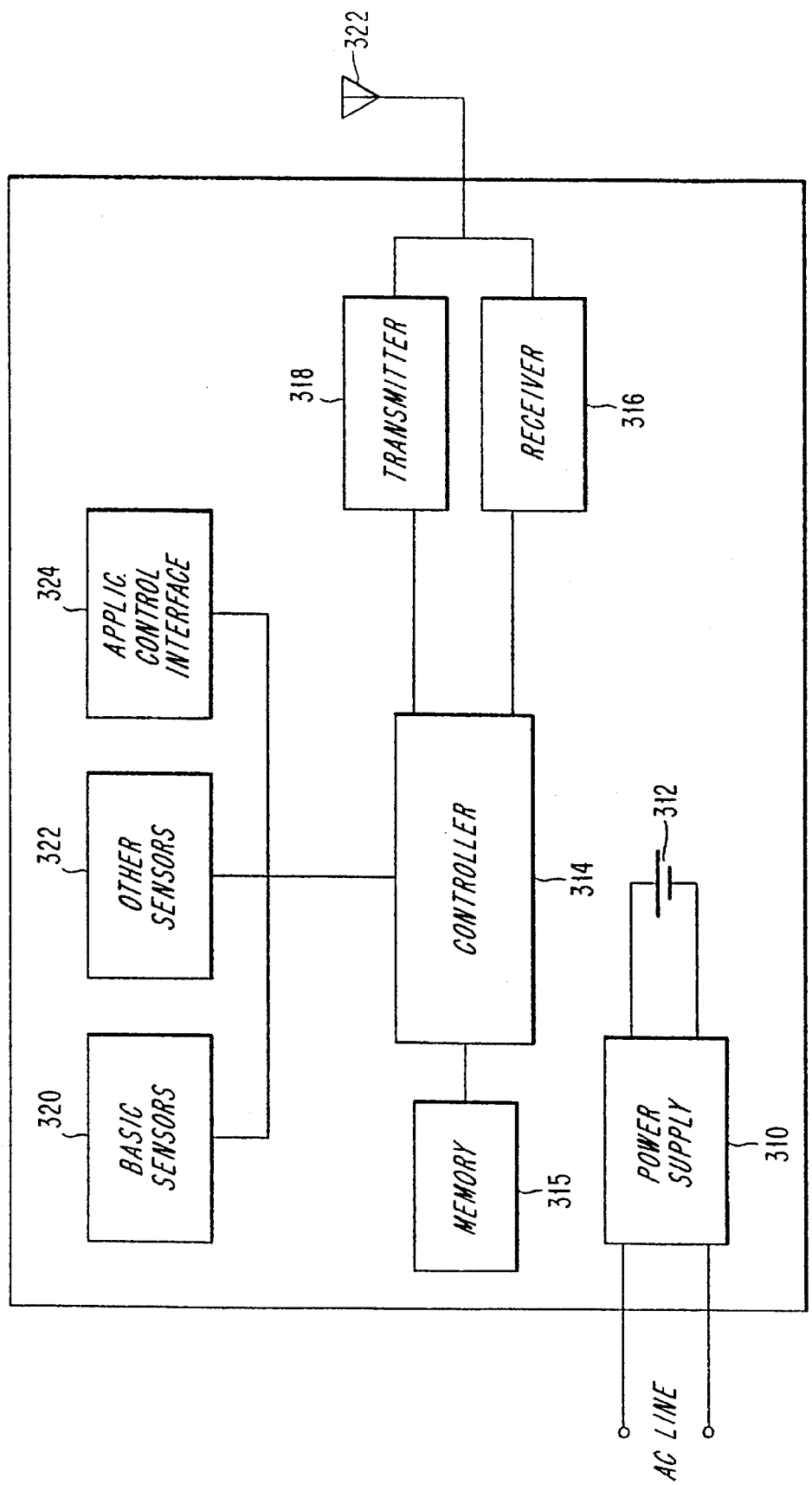
FIG. 2 is a network service module block diagram.

In the exemplary arrangement shown in FIG. 2, the network service module (NSM) 110 includes NSM-receiver means, NSM-transmitter means, NSM-processor means, NSM-memory means and an NSM antenna 322. The NSM-transmitter means and the NSM-receiver means are coupled to the NSM antenna 322. The NSM-processor means is coupled to the NSM-transmitter means, NSM-receiver means, NSM-memory means and the physical device. The physical device is shown as basic 320 and other sensors 322, and application control interface 324.

The NSM-receiver means is embodied as an NSM receiver 316, and is optional. If an NSM receiver 316 is included with the network service module, then the NSM receiver 316 can be used for receiving a command signal, which includes signalling data. The command signal can be transmitted at either a first carrier frequency or a second carrier frequency. Normally the first carrier frequency is used by the NSM-transmitter means for transmitting to a remote cell node. In a preferred embodiment, the NSM receiver 316 receives the command signal on the first carrier frequency for spectrum efficiency. Thus, the wide area communications network can operate using only a single carrier frequency, i.e., the first carrier frequency. The command signal can provide a time reference for updating a local clock, and serve as a frequency reference to the network service module. Signalling data, such as manage service disconnect or control loads, also may be sent from the remote cell node to the network service module using the command signal. While the network service modules could be polled by the command signal, in general, such polling is not required and preferably is not used with the present invention.

The NSM-processor means, which is embodied as an NSM controller 314, arranges data from the physical device into packets of data, and transfers the data to the NSM-memory means which is embodied as an NSM memory 315. The NSM controller 314 may be a microprocessor or equivalent circuit for performing the required functions. The NSM controller 314 uses the received command signal for adjusting and setting the first carrier frequency of the NSM transmitter. The NSM data may include meter readings, time of use and other information or status from a plurality of sensors. The NSM controller 314, for each network service module throughout a geographical area, can be programmed to read all the corresponding utility meters or other devices being serviced by the network service module, respectively. The NSM controller 314 can be programmed to read peak consumption at predetermined intervals, such as every 15 minutes, throughout a time period, such as a day. The NSM controller 314 also can be programmed to track and store maximum and minimum sensor readings or levels throughout the time period, such as a day.

The NSM memory 315 stores NSM data from the physical device. NSM data may include meter reading data and time of use (TOU) and other information or status from a plurality of sensors. The NSM memory 315 may be random access memory (RAM) or any type of magnetic media or other memory storage devices known in the art.

The NSM-transmitter means is embodied as an NSM transmitter 318. The NSM transmitter 318 transmits at a first carrier frequency the respective NSM data from the physical device in a brief message packet called an NSM-packet signal. The NSM-packet signal might have a time duration of 100 milliseconds, although any time duration can be used to meet particular system requirements. The NSM-packet signal transmitted by the NSM transmitter 318 follows a generic or fixed format; and a representative message packet is illustrated in FIG. 3. Included in the message is: preamble; opening frame; message type; message identification; service module type; message number; service module address; data field; error detection; and closing frame.

The NSM transmitter 318 is connected to an NSM antenna 322 for transmitting multi-directionally the NSM-packet signals. The NSM transmitter 318 includes a synthesizer or equivalent circuitry for controlling its transmitter carrier frequency and schedule.

The NSM-packet signal is transmitted at a time which is randomly or pseudorandomly selected within a predetermined time period, i.e., using a one-way-random-access protocol, by the NSM-processor means. In order to simplify network operation and reduce costs, the wide area communications network does not poll individual network service modules. Rather, each network service module reports autonomously at a rate appropriate for the application being supported. Routine reports are therefore transmitted randomly or pseudorandomly at fixed average intervals, while alarm signals are transmitted immediately following detection of alarm conditions. Alarm signals may be transmitted several times with random delays. This avoids interference among alarm messages if many alarms occur simultaneously, as in an area-wide power outage.

As an alternative arrangement, the network service module may be programmed to transmit three different types of messages at different intervals. The first type of message can relate to the accumulated usage information. The second type of message can relate to an alarm condition which is basically transmitted immediately. The alarm conditions that occur might relate to a tamper action or to the absence of electrical voltage indicative of a power failure. The third type of information which may be transmitted less frequently can relate to the housekeeping information.

After preparing the packet of data for transmission, the NSM controller 314 is arranged to hold the data packet for a random period of time. This random period can be calculated using various randomizing techniques including, for example, a psuedo-random sequence followed, for example, by an actual random calculation based upon the rotation of the metering disk at any particular instant. In this way each of the network service modules is arranged to transmit at a random time. The NSM controller 314 is arranged so that the transmission does not occur within a particular predetermined quiet time so that none of the network service modules is allowed to transmit during this quiet time. This quiet time could be set as one hour in every eight hour period. In this way after an eight hour period has elapsed, each of the network service modules would transmit at a random time during the subsequent seven hours followed by one hour of quiet time.

Network capacity or throughput is limited by the probability of message collisions at each remote cell node 112. Because all network service modules 110 share a single carrier channel and transmit at random times, it is possible for several network service modules 110 within a range of a particular remote cell 112 node to transmit simultaneously and to collide at the remote cell node. If the received signal levels are comparable, the overlapping messages will mutually interfere, causing receive errors and both messages will be lost. However, if one signal is substantially stronger than the other, the stronger signal will be successfully received. Moreover, since both signals are received by at least two and preferably four of the remote cell nodes, the probability of both messages being received is fairly high unless the network service modules are in close spatial proximity. During an interval T, each transmitter within a cell surrounding a single remote cell node sends a single randomly timed message of duration M to several potential receive stations.

N= no. of transmitters/cell
M= message duration (seconds)
T= message interval
$P_c$= probability of collision
$P_s$= probability of no collision Once any Transmitter, $T_i$, starts transmitting, the probability that another particular transmitter, $T_j$, will complete or start another transmission is 2M/T.

The probability that there will be no collision is 1–2M/T.

If there are N-1 other transmitters the probability of no collision, $P_s$, is given by $$P_s = (1-2M/T)^{N-1}$$

For large N $$P_s = (1-2M/T)^N$$

For a given Transmitter, Ti, the probability of a collision occurring during the interval T is $$P_c = 1 - P_s = 1 - (1-2M/T)^N$$

The probability of collisions occurring on An successive tries is $$P_{cn} = (P_c)^{An}$$

For M=0.3 T=8 hrs.=28.8×10³ secs.

| N | Ps | Pc1 | Pc2 | Pc3 |
|---|------|-------|------------------|------------------|
| 100 | .9979 | .0021 | 4 × 10⁻⁶ | 8 × 10⁻⁹ |
| 200 | .9958 | .0042 | 1.6 × 10⁻⁵ | 6.4 × 10⁻⁸ |
| 500 | .9896 | .0104 | 10⁻⁴ | 10⁻⁶ |
| 1,000 | .9794 | .0206 | 4 × 10⁻⁴ | 8 × 10⁻⁶ |
| 2,000 | .9591 | .041 | 1.6 × 10⁻³ | 6.8 × 10⁻⁵ |
| 5,000 | .9010 | .099 | 9.8 × 10⁻³ | 9.7 × 10⁻⁴ |
| 10,000 | .811 | .189 | 3.5 × 10⁻² | 6.7 × 10⁻³ |

From the viewpoint of a remote cell node, the number of transmitters, $N_T$, whose signal level exceeds the receiver noise level and can, therefore, be received reliably depends on:

(a) the density of transmitters;
(b) transmit power level;
(c) propagation path loss;
(d) background noise.

Propagation path loss is highly variable due to attenuation, reflection, refraction and scattering phenomena which are a function of terrain, building structures, and antenna location. Some of these parameters can even vary on a diurnal and seasonal basis.

In estimating network performance however, the simple message collision model is not completely accurate because:

1. random noise bursts from various sources can obscure messages which do not collide;

2. some colliding message signals will be of sufficiently different amplitude that the stronger signal will still be received correctly.

A statistical model can be developed to provide data by which determination can be made of the best location and number of remote cell nodes for a particular geographical location. Thus, the model can include data relating to house density, the N-value defined above relating to the attenuation of the signal, and the location and presence of trees.

FIG. 4 is an illustrative listing of applications supported by the network service module within the wide area communications network. The following is a detailed discussion of the electricity meter application.

Network Service Module with an Electricity Meter

Figure 5:
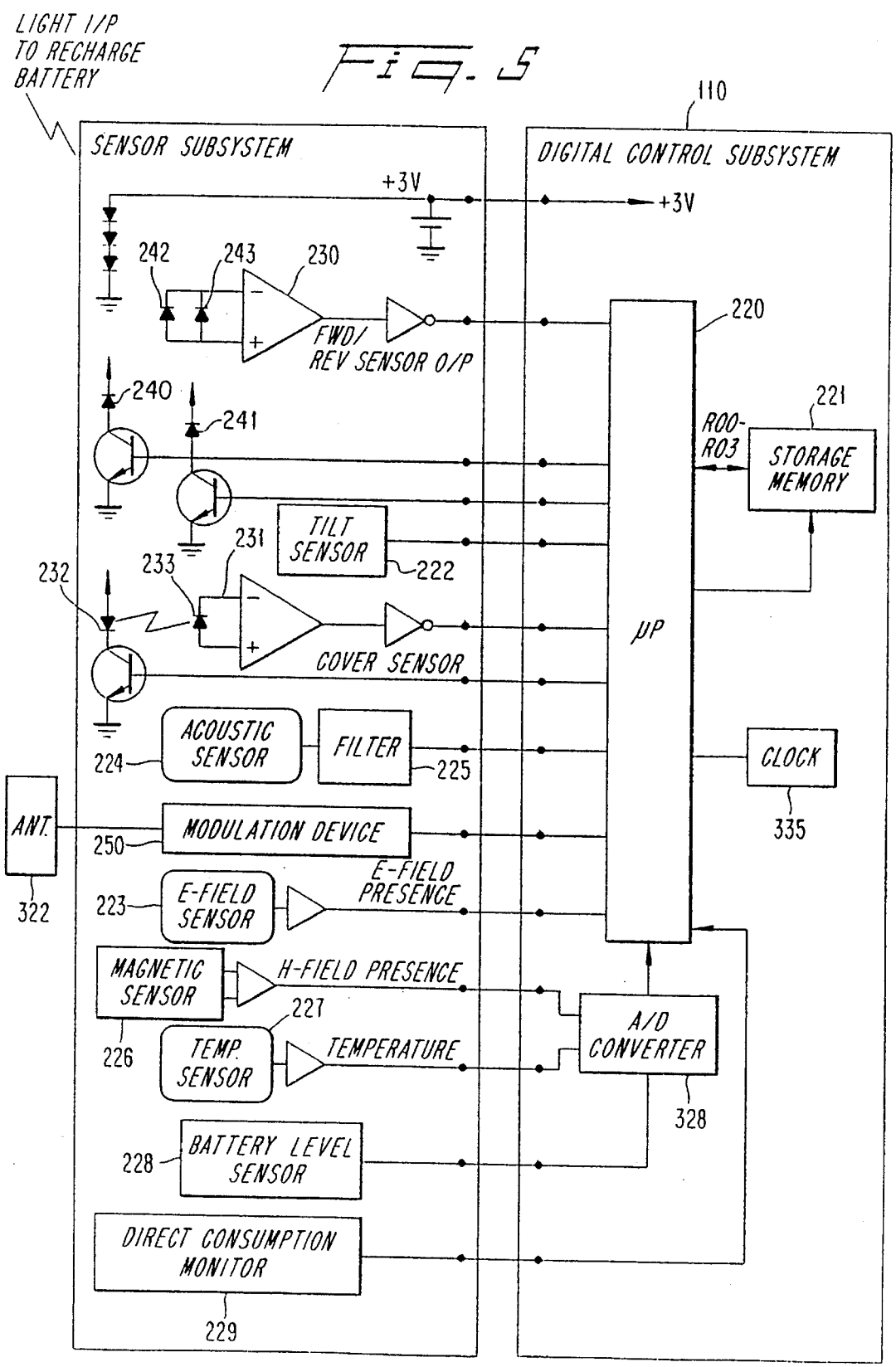
FIG. 5 is a schematic diagram of a network service module.
Figure 6:
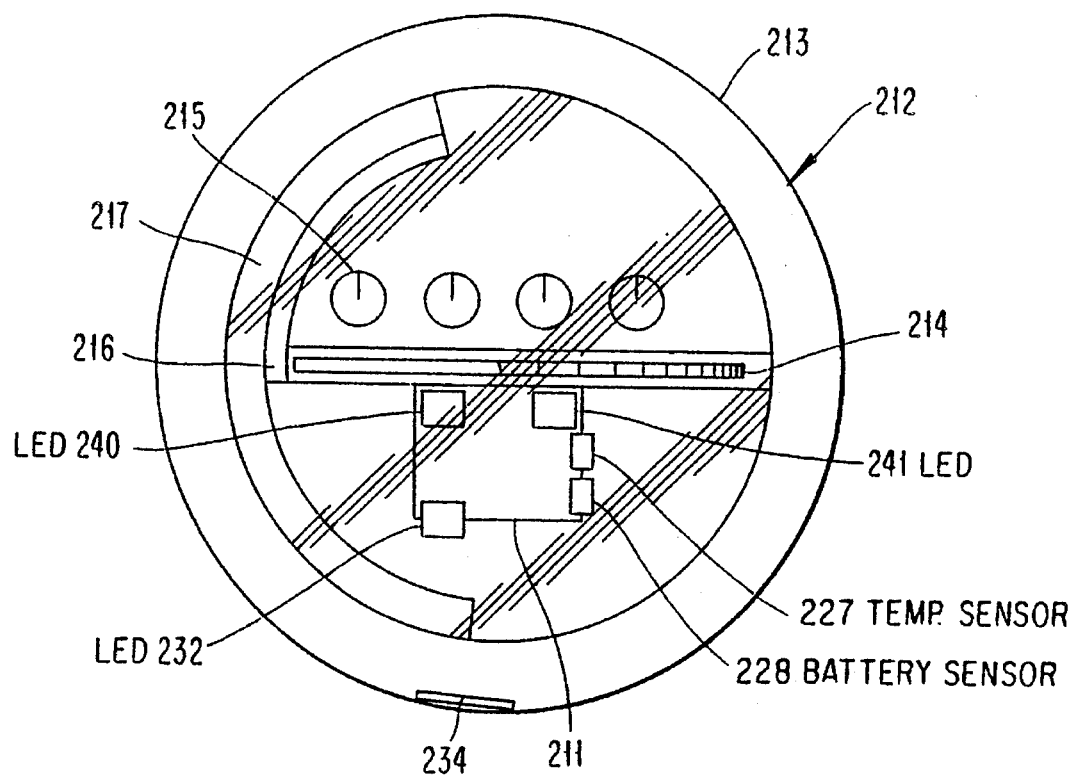
FIG. 6 shows a front elevation view of an electricity utility meter with a detection unit.
Figure 7:
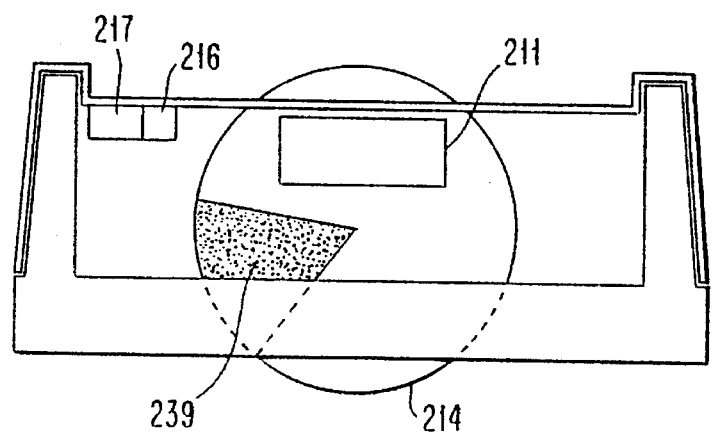
FIG. 7 shows a bottom plan view of the electricity utility meter.

A network service module 110 schematically is shown in FIG. 5 and is mounted in a suitable housing 211 illustrated in FIGS. 6 and 7 with the housing including suitable mounting arrangement for attachment of the housing into the interior of a conventional electricity meter 212. Each network service module is coupled to a respective physical device. In FIG. 6, the physical device is an electricity meter 212.

Referring to FIGS. 5, 6 and 7, the electricity meter 212 includes an outer casing 213 which is generally transparent. Within the casing is provided the meter system which includes a disk 214 which rotates about a vertical axis and is driven at a rate dependent upon the current drawn to the facility. The numbers of turns of the disk 214 are counted by a counting system including mechanical dials 215. The meter is of conventional construction and various different designs are well known in the art.

An antenna 322 is mounted on a bracket 216 carried on the housing inside the casing 213. The antenna as shown is arc-shaped extending around the periphery of the front face. Other antenna configuration are possible.

The NSM antenna 322 of each of the network service modules 110 is mounted within the housing of the meter. Thus the NSM antenna 322 is mounted on the support structure itself of the network service module 110. This enables the network service module 110 to be manufactured relatively cheaply as an integral device which can be installed simply in one action. However, this provides an NSM antenna 322 which can transmit only relatively short distances. In addition, the power level is maintained at a relatively low value on the order of 10–100 milliwatts, the energy for which can be provided by a small battery system which is relatively inexpensive. An NSM antenna 322 of this type transmitting at the above power level would have a range on the order of one to two kilometers.

The network service module 110 is in a sealed housing which prevents tampering with the sensors, microprocessor 220 and memory 221 located within the housing.

Turning now to FIG. 5, the network service module optionally may include a detection device which uses the microprocessor 220 which has associated therewith a storage memory 221. An essential sensor is for meter reading, for measuring the amount of electricity, amount of water or amount of gas consumed. Such a sensor eliminates the need for a meter reader person, by allowing the system to automatically report the amount of usage of the physical device.

Any number of sensors may be provided for detection of tampering events with the network service module of the present invention, and the sensors may be adapted for electricity, gas, water or other applications. For the most part, information reported by the various sensors would be considered low data rate. The wide area communications network supports distributed automation functions including basic meter reading, time of use meter reading, service connect and disconnect operations, alarm reporting, theft of service reporting, load research, residential load control, commercial and industrial load curtailment, and distributed supervisory control and data acquisition (SCADA). Furthermore, the wide area communications network is readily expandable to support new applications as they are developed.

While the emphasis, by way of example, is automatic meter reading and on measuring time of use of an electricity meter, other functions such as 15-minute peak consumption recording, line power monitoring, i.e., outage and restoration, tamper sensing and timekeeping are supported.

The following is a representative listing of possible sensors that may be used with the network service module of the present invention. Each sensor is optional, and to a person skilled in the art, variants may be added to the network service module of the present invention.

For example, FIG. 6 illustratively shows a temperature sensor 227 and a battery sensor 228; however, each sensor 227, 228 may be substituted by or may be in addition to other possible sensors from the following representative listing of sensors.

(a) A tilt sensor 222 detects movement of the housing through an angle greater than a predetermined angle so that once the device is installed indication can be made if the device is removed or if the meter is removed from its normal orientation.

(b) An field sensor 223 detects the presence of an electric field. Unless there is power failure, the electric field sensor should continue to detect the presence of an electric field unless the meter is removed from the system.

(c) An acoustic sensor 224 detects sound. The sounds detected are transmitted through a filter 225 which is arranged to filter by analog or digital techniques the sound signal so as to allow to pass through only those sounds which have been determined by previous experimentation to relate to cutting or drilling action, particularly on the cover.

(d) A magnetic sensor 226 detects the presence of a magnetic field. A magnetic field is generated by the coils driving the disk 214 so that magnetic fields should always be present unless the meter has been by-passed or removed. As is well known, the rate of rotation of the disk is dependent upon the magnetic field and, therefore, this rate of rotation can be varied by changing the magnetic field by applying a permanent or electromagnet in the area of the meter to vary the magnetic field. The sensor 226 is, therefore, responsive to variations in the magnetic field greater than a predetermined amount so as to indicate that an attempt has been made to vary the magnetic field adjacent the disk to slow down the rotation of the disk.

(e) A heat sensor 227 detects temperature so that the temperature associated with a particular time period can be recorded. A batter level sensor is indicated at 228. The sensors 226, 227 and 228 communicate information through analog digital converter indicated at 228 to the microprocessor 220. The information from sensors 227 and 228 can be communicated to provide "housekeeping" status of the operation of the unit. The sensor 227 relating to the temperature can be omitted if required and this information replaced by information gained from a public weather information source. In some cases the meter is located inside the building and hence the temperature will remain substantially constant whereas the outside temperature is well known to vary consumption quite dramatically.

(f) A consumption sensor 229 comprises a direct consumption monitor which can be of a very simple construction since it is not intended to act as an accurate measure of the consumption of the electricity used. The direct consumption monitor can, therefore, simply be a device which detects the value of the magnetic field generated on the assumption this is proportional to the current drawn. The direct consumption value obtained can then be compared with a measurement of the consumption as recorded by the rotation of the disk 214. In the event that the direct consumption monitor provides a sum of the consumption over a time period which is different from the consumption measured by rotation of the disk 214 by an amount greater than a predetermined proportion then the direct consumption monitor can be used to provide a tamper signal. This would be indicative for example of a mechanical tag applied to the disk to reduce recorded consumption.

(g) A reverse sensor 230, discussed in more detail hereinafter, detects reverse rotation of the disk 214 and provides an input to the microprocessor on detection of such an event.

(h) A cover sensor 231 is used to detect the continual presence of the cover 213. The cover sensor comprises a light emitting diode (LED) 232 which generates a light beam which is then reflected to a photo diode 233. The absence of the reflected beam at the photo diode 233 is detected and transmitted as a tamper signal to the microprocessor. The reflected beam is generated by a reflective strip 234 applied on the inside surface of the cover adjacent the diode 232 as shown in FIG. 5.

The above sensors thus act to detect various tampering events so that the presence of such tampering event can be recorded in the memory 221 under the control of the microprocessor 220.

The microprocessor 220 also includes a clock signal generator 335 so that the microprocessor 220 can create a plurality of time periods arranged sequentially and each of a predetermined length. In the example of the present invention shown, the time periods are eight hours in length and the microprocessor 220 is arranged to record in each eight hour period the presence of a tamper event from one or more of the tamper signals.

Figure 8:
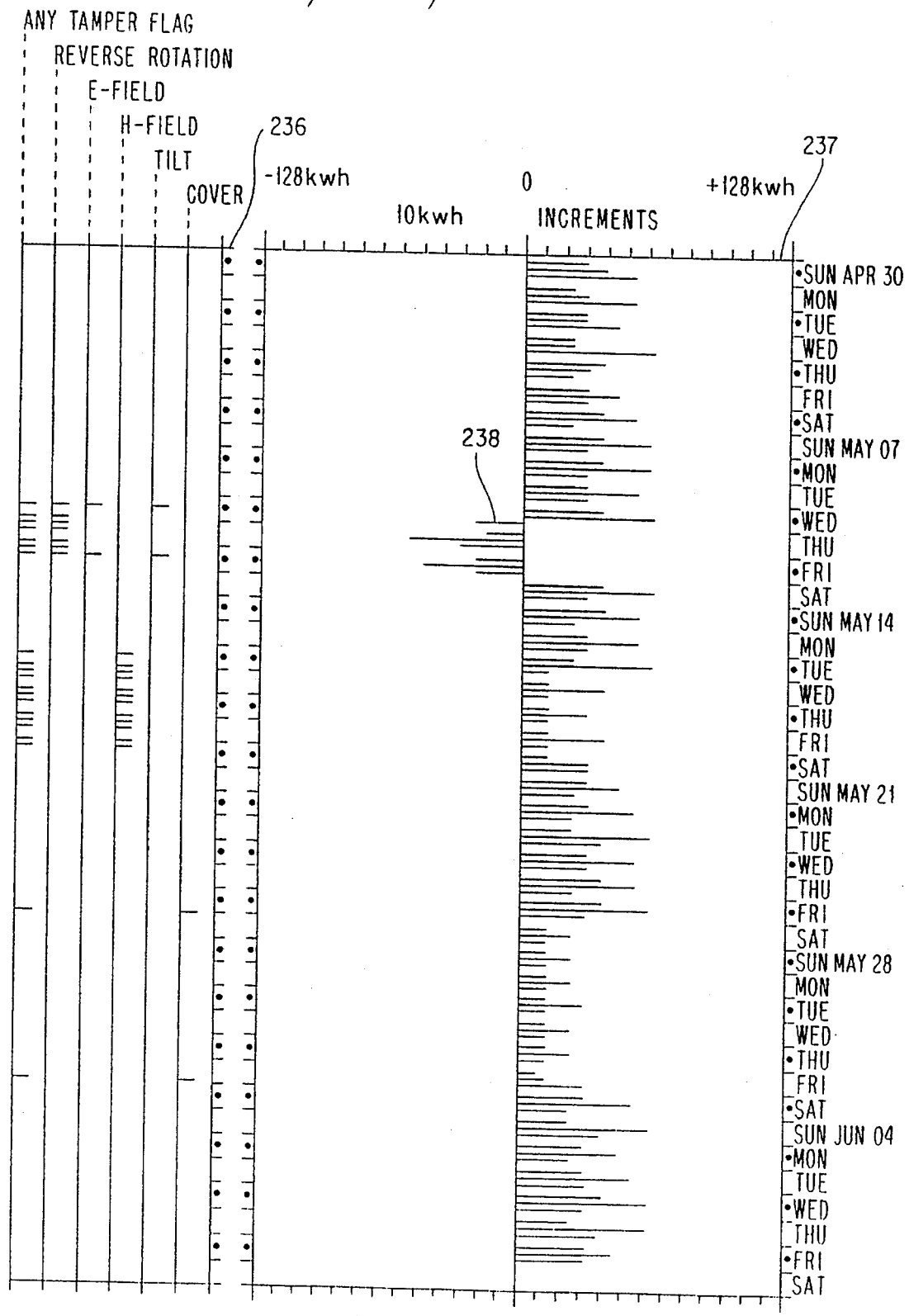
FIG. 8 is an illustration of a typical printout of information obtained by the network service module of FIG. 1.

As shown in FIG. 8, the series of the predetermined time periods is recorded with the series allocated against specific dates and each eight hour period within the day concerned having a separate recording location within the memory 221. One such series is shown in FIG. 8 where a number of tampering events 236 are indicated. The print-out thus indicates when any tampering event 236 has occurred and in addition then identifies which type of tampering event has taken place.

The rotation of the disk 214 also is detected to accurately record the number of rotations of the disk both in a forward and in a reverse direction. In FIG. 7 a table 237 shows in graphical form the amount of rotation of a disk recorded in eight hour periods as previously described. For one period of time the disk is shown to rotate in a reverse direction 238. Whenever the disk rotates in a reverse direction, the reverse rotation subtracts from the number of turns counted on the conventional recording system 215.

The detection of the rotation of the disk is carried out by the provision of a dark segment 239 formed on the undersurface of the disk, leaving the remainder of the disk as a reflective or white material. The detection system thus provides a pair of light emitting diodes 240, 241 which are positioned on the housing so as to direct light onto the underside of the disk. The light emitting diodes 240, 241 are angularly spaced around the disk. The diodes are associated with the photo diodes 242, 243 which receive light when the disk is positioned so that the light from the associated light emitting diode 240, 241 falls upon the reflective part of the disk and that light is cut off when the dark part of the disk reaches the requisite location. Basically, therefore, one of the pairs of light emitting diodes 240, 241 and photo diodes 242, 243 is used to detect the passage of the dark segment that is, of course, one rotation of the disk 214. The direction of rotation is then detected by checking with the other of the pairs as the dark segment reaches the first of the pairs as to whether the second pair is also seeing the dark segment or whether it is seeing the reflective part. Provided the sensors are properly spaced in relation to the dimension of the segment, therefore, this indicates the direction which the disk rotated to reach the position which is detected by the first pair of diodes.

In order to conserve energy, the sensors are primarily in a sampling mode using an adaptive sensing rate algorithm. In one example the dark or non-reflective segment is 108° of arc and there is provided a 50° displacement between the sensors. In a practical example of a conventional meter, the maximum rotation rate is of the order of 2 rps. A basic sample interval can be selected at 125 m/sec, short enough to ensure at least one dark sample is obtained from the dark segment. In operation, only the first pair of sensors is sampled continuously. When a dark response is observed, a second confirming sample is obtained and the sample rate increased to 16 pps. As soon as a light segment of the disk is sensed, the second sensor is sampled. If the second sensor still sees the dark segment, then clockwise rotation is confirmed; if a light segment is observed, then counter clockwise rotation is indicated.

At slower speeds, the algorithm results in a sample rate of 8 pps for 70% of a rotation and 16 pps for 30% of a rotation for the first pair of sensors plus two samples for direction sensing for the second pair. For an annual average consumption of 12,000 kwh, the disk rotates approximately 1.6 million times.

In order to sense the presence of stray light which could interfere with measurements, the photo diode output is sampled immediately before and immediately after the LED is activated. If light is sensed with the LED off, stray light is indicated and alarm may be initiated after a confirming test. The latter may include a test of other sensors such as the optical communication port sensor discussed hereinafter.

As shown in FIG. 5, communication from the meter reading unit is carried out by radio transmission from the microprocessor 220 through a modulation device 250 which connects to the antenna 322. The transmission of the signal is carried under control of the microprocessor 220. Modulation carried out by the modulation device 250 can be of a suitable type including, for example, phase modulation using phase shift keying (PSK) such as binary PSK (BPSK), frequency modulation using frequency shift keying (FSK), such as, for example, binary FSK, or spread spectrum modulation in which the signals are modulated onto a number of separate frequencies at timed intervals so that no single frequency channel is used. This allows the system to be used without the allocation of a dedicated frequency so that the signal appears merely as noise to receivers which do not have access to the decoding algorithm by which the signal can be recovered from the different frequencies on which it is transmitted.

Remote Cell Node

A plurality of remote cell nodes 112 are located within the geographical area and are spaced approximately uniformly and such that each network service module 110 is within a range of several remote cell nodes 112 to provide overlapping coverage. The remote cell nodes 112 typically might be spaced at 0.5 mile intervals on utility poles or light standards. Each remote cell node 112 provides coverage over a limited area much like the cell in a cellular telephone network. Remote cell nodes 112 preferably are spaced to provide overlapping coverage, so that on an average, each NSM-packet signal transmitted by a network service module 110 is received by three or four remote cell nodes 112, even in the presence of temporary fading. As a consequence, erection of a tall building near a network service module 110 has little or no effect on message reception, nor does the failure of a remote cell node 112 result in loss of NSM-packet signals or NSM data.

Figure 9:
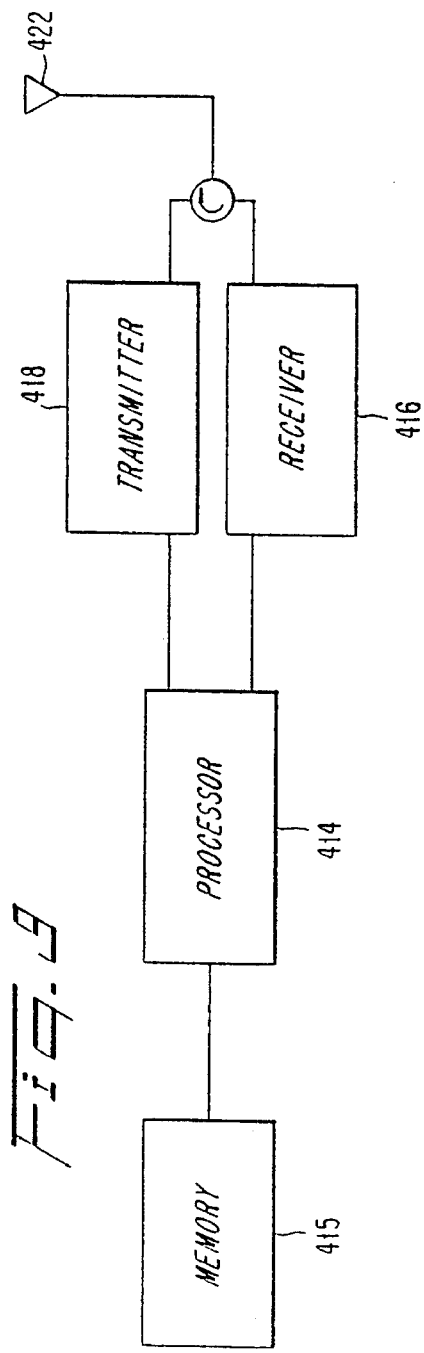
FIG. 9 is a remote cell node block diagram.

As illustratively shown in FIG. 9, each remote cell node (RCN) 112 of FIG. 1 includes first RCN-transmitter means, second RCN-transmitter means, RCN-receiver means, RCN-memory means, RCN-processor means and an RCN antenna 422. The RCN-transmitter means, RCN-receiver means, RCN-memory means and RCN-processor means may be embodied as an RCN transmitter 418, RCN receiver 416, RCN memory 415 and RCN processor 414, respectively. The RCN transmitter 418 and the RCN receiver 416 are coupled to the RCN antenna 422. The RCN processor 414 is coupled to the RCN transmitter 418, RCN receiver 416, and RCN memory 415.

The RCN transmitter 418, under the control of the RCN processor 414, transmits a command signal at the first carrier frequency or the second carrier frequency. The choice of frequency depends on which frequency is being used for the NSM receiver 316 at each of the plurality of network service modules 110. Transmitting a command signal from the RCN transmitter 418 is optional, and is used if the NSM receiver 316 is used at the network service module 110. The command signal can include signalling data being sent to the network service modules 110. The signalling data may require the network service modules 110 to transmit status or other data; set reporting time period, e.g. from an eight hour period to a four hour period; and contain any other command, control or "housekeeping" jobs as required.

The RCN receiver 416 receives at the first carrier frequency a multiplicity of NSM-packet signals transmitted from a multiplicity of network service modules. Each of the multiplicity of NSM-packet signals typically are received at different points in time, since they are transmitted at a time which is randomly or pseudorandomly selected within the predetermined time period. The multiplicity of network service modules usually is a subset of the plurality of network service modules 110. Received NSM-packet signals are time stamped by the RCN processor 414 and temporarily stored in the RCN memory 415 before being transmitted to the next higher network level. The RCN receiver 416 also receives polling signals from the intermediate data terminal, and listens or eavesdrops on neighboring remote cell nodes when they are polled by the intermediate data terminal.

The RCN processor 414 collates the NSM-packet signals received from the network service modules, identifies duplicates of NSM-packet signals and deletes the duplicate NSM-packet signals. The RCN processor 414 controls the RCN transmitter 418 and RCN receiver 416. The RCN memory 415 stores the received multiplicity of NSM-packet signals. Thus each remote cell node 112 receives, decodes and stores in RCN memory 415 each of these data packets as received from the network service modules 110.

The remote cell node comprises a suitable resistant casing which can be mounted upon a building, lamp standard or utility pole at a suitable location in the district concerned. The remote cell node can be battery-powered with a simple omni-directional antenna as an integral part of the housing or supported thereon.

Information accumulated at remote cell nodes 112 periodically is forwarded via a polled radio communications link to a higher level network node, as illustrated in FIG. 1, termed an intermediate data terminal 114. The intermediate data terminals 114 are spaced typically at 4 mile intervals and can be conveniently sited at substations, providing coverage for up to 100 cells. Remote cell nodes also receive timing information and command signals from intermediate data terminals.

When a polling signal is sent from an intermediate data terminal 114, the RCN transmitter 418 transmits at the first carrier frequency the stored multiplicity of NSM-packet signals as an RCN-packet signal to the intermediate data terminal 114.

When a first remote cell node is polled with a first polling signal by the intermediate data terminal, neighboring remote cell nodes 112 receive the RCN-packet signal transmitted by the first remote cell node. Upon receiving an acknowledgment signal from the intermediate data terminal that polled the first remote cell node, at the neighboring remote cell nodes 112 the respective RCN processor deletes from the respective RCN memory messages from the network service modules that have the same message identification number as messages transmitted in the RCN-packet signal from the first remote cell node to the polling intermediate data terminal. The message identification number is illustrated in a typical NSM-data packet in FIG. 3.

FIG. 1 illustrates a plurality of the network service modules 110. The network service modules 110 are set out in a pattern across the ground which is dependent upon the positions of the utility usage which generally does not have any particular pattern and the density will vary significantly for different locations.

The remote cell nodes 112 are arranged in an array with the spacing between the remote cell nodes 112 relative to the network service modules 110 so that each network service module can transmit to at least two and preferably four of the remote cell nodes 112. Thus, the remote cell nodes 112 are provided in significantly larger numbers than is absolutely necessary for each network service module 110 to be received by a respective one of the remote cell nodes 112. The remote cell nodes 110 theoretically receive high levels of duplicate information. In a normal residential situation, the location of the remote cell nodes 112 so that each network service module 110 can be received by four such remote cell nodes 112 would lead to an array in which each remote cell node 112 would be responsive to approximately 1,000 of the network service modules 110.

Each of the network service modules 110 is arranged to calculate an accumulated value of utility usage for a set period of time which, in the example shown, is eight hours. Subsequent to the eight hour period, the NSM controller 314 prepares to transmit the information in a packet of data as an NSM-packet signal. The packet of data includes:

(a) The total of usage during the set period, i.e. eight hours.

(b) The accumulated total usage stored in the NSM memory 315 to date. The transmission of this information ensures that even if a message is lost so that the total for one of the time periods is not communicated to the central data terminal, the central data terminal 120 can recalculate the amount in the missing time periods from the updated accumulated total.

(c) Some or all of the tamper signals defined above.

(d) The time of transmission.

(e) A message number so that the messages are numbered sequentially. In this way, again the remote cell node 112 can determine whether a message has been lost or whether the information received is merely a duplicate message from a duplicate one of the receiving stations.

(f) "Housekeeping information" concern the status of the network service module 110, for example, the temperature and the battery level indicator sensor values.

When information is received at the remote cell node 112, the RCN controller 414 acts to store the information received in the RCN memory 415 and then to analyze the information. The first step in the analysis is to extract from the received messages the identification code relating to the respective network service module 110. The information relating to that network service module 110 is introduced into a RCN memory register relating to that network service module 110 to update the information already stored.

One technique for avoiding transmission of duplicate information from the remote cell nodes 112 to the intermediate data terminal 114 can be used in which each remote cell node 112 monitors the transmissions of the other remote cell nodes 112. When the signals are monitored, the information transmitted is compared with information stored in any other remote cell node 112 doing the monitoring and if any information is found in the memory of the remote cell node 112 which is redundant, that information is then cancelled. In this way when very high levels of redundancy are used, the time for transmission from the remote cell node 112 to the intermediate data terminal is not significantly increased.

In addition to the periodic transmission of the usage data, each network service module 110 can be arranged to transmit an alarm signal upon detection of the removal of the electric voltage. The transmission of the alarm signal can be delayed by a short random period of time so that if the loss of the voltage is due to a power outage covering a number of locations all signals are not received at the same time. The remote cell nodes 112 and intermediate data terminals 114 also can be programmed to retransmit such alarm signals immediately. In this way the central data terminal 120 has immediate information concerning any power outages including the area concerned. This can, of course, enable more rapid repair functions to be initiated.

Furthermore, the remote cell nodes 112 can be arranged to transmit control signals for operating equipment within the premises in which the network service module 110 is located. The remote cell nodes 112 are necessarily arranged in a suitable array to transmit such information so that it is received in each of the premises concerned using again relatively low transmission power and using the equipment provided for the meter reading system. This transmission capability can be used to control, for example, radio controlled switches within the premises of relatively high power equipment for load shedding at peak periods. In similar arrangements the network service module 110 may include a receiving facility to enable detection of signals transmitted by the remote cell nodes 112. In one example, these signals may relate to synchronization so that each of the network service modules 110 is exactly synchronized in time with the remote cell node 112 and/or intermediate data terminal 114 and central data terminal 120. This exact synchronization can be used for accurately detecting usage during specific time periods so that the utility may charge different rates for usage during different time periods for the purpose of encouraging use at non-peak times, again for load shedding purposes.

The attenuation of a radio signal is proportional to the inverse of the distance from the source to the power N. In free space, N is equal to 2. In more practical examples where buildings, trees and other geographical obstructions interfere with the signal, N generally lies between 4.0 and 5.0. This attenuation effect, therefore, significantly reduces the distance over which the signal from the network service module can be monitored. Thus, the number of network service modules is which can be monitored by a single remote cell node is significantly reduced. Furthermore, the large N rapidly reduces the signal strength after a predetermined distance so that, while a network service module can be effectively monitored at a certain distance, the signal strength rapidly falls off beyond that distance. This enables the cells defined by each remote cell node 112 to be relatively specific in size and for the degree of overlap of the cells to be controlled to practical levels without wide statistical variations.

An advantage of the present system is that network service modules 110 which are located at a position which is geographically very disadvantageous for transmission to the closest remote cell node 112 may be monitored by a different one of the remote cell nodes 112. Thus, in conventional systems some of the network service modules 110 may not be monitored at all in view of some particular geographical problem. In the present invention this possibility is significantly reduced by the fact that the network service module 110 concerned is likely to be in a position to be monitored by a larger number of the remote cell nodes 112 so that the geographical problem most probably will not apply to all of the remote cell nodes.

The increased density of remote cell nodes 112 permits the network service modules 110 to operate with an integral NSM antenna 322 which can be formed as part of the meter reading unit housed within the conventional electric utility meter. In this way the network service module 110 can be totally self-contained within the meter housing thus allowing installation within a very short period of time, avoiding customer dissatisfaction caused by wiring problems and reducing the possibility of damage to a separately mounted NSM antenna 322. In addition, this arrangement significantly reduces the cost of the network service module 110 to a level which is economically viable to allow installation of the system.

The present invention can employ a system in which the network service modules 110 are permitted to transmit only during a predetermined time period so that an open time period is available for communication on the same frequency between the intermediate data terminal 114 and the remote cell node 112 without any interference from the network service module 110. This level of communication can be carried out using a polling system from the intermediate data terminals 114 to each of the remote cell nodes 112 in turn, preferably including a directional transmission system at the intermediate data terminal 114. This system allows optimization of the remote cell node 112 density to meet cost/performance criteria in different deployment scenarios.

The present invention, by recognizing the non-volatile nature of the information source and the acceptability of missing an occasional update through transmission errors or collisions enables the implementation of data collection networks of greater simplicity and at lower cost than is possible with established communication network approaches involving two-way communication. The present invention, therefore, provides a radio communication network which can be employed to acquire data from a large number of remote meter monitoring devices disposed over a wide area using very low-power transmitters in conjunction with an array of remote cell nodes all operating on a single radio communication channel or frequency.

Intermediate Data Terminal

The plurality of intermediate data terminals 114 are located within the geographic area and are spaced to form a grid overlaying the geographic area. The intermediate data terminals 114 typically are spaced to cover large geographic areas. Intermediate data terminals 114 preferably are spaced to provide overlapping coverage, so that on an average, an RCN-packet signal transmitted from a remote cell node 112 is received by two or more intermediate data terminals.

Figure 10:
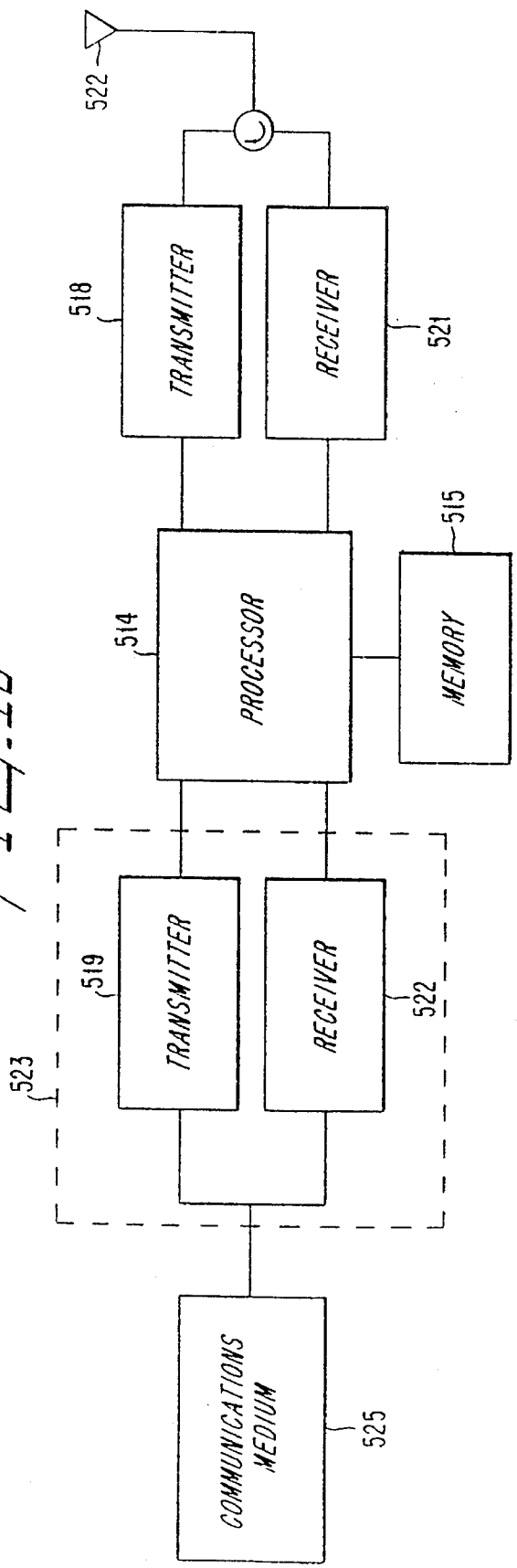
FIG. 10 is an intermediate data terminal block diagram.

As illustratively shown in FIG. 10, each intermediate data terminal 114 includes first IDT-transmitter means, second IDT-transmitter means, IDT-memory means, IDT-processor means, first IDT-receiver means, second IDT-receiver means and an IDT antenna 522. The first IDT-transmitter means, second IDT-transmitter means, IDT-memory means, IDT-processor means, first IDT receiver means and second IDT-receiver means may be embodied as a first IDT transmitter 518, second IDT transmitter 519, IDT memory 515, IDT processor 514, first IDT receiver 521 and second IDT receiver 522, respectively. The first IDT transmitters 518 and the first IDT receiver 521 are coupled to the IDT antenna 522. The IDT processor 514 is coupled to the first and second IDT transmitters 518, 519, the first and second IDT receivers 521, 522 and IDT memory 515. The second IDT transmitter 519 and second IDT receiver 522 may be embodied as a device such as a modem 523.

The first IDT transmitter 518 under the control of the IDT processor 514, includes a synthesizer or equivalent circuitry for controlling the carrier frequency, and allowing the first IDT transmitter 518 to change carrier frequency. The first IDT transmitter 518 transmits preferably at the first carrier frequency, or the second carrier frequency, the first polling signal using a first polling-access protocol to the plurality of remote cell nodes 112. When the first polling signal is received by a remote cell node, that remote cell node responds by sending the RCN-packet signal to the intermediate data terminal 114 which sent the first polling signal. If the intermediate data terminal 114 successfully receives the RCN-packet-signal, then the first IDT transmitter 518 sends an acknowledgment signal to the remote cell node. Upon receiving the acknowledgment signal, the RCN processor 414 at that remote cell node deletes, from the RCN memory 418, the data sent in the RCN-packet signal to the intermediate data terminal.

Intermediate data terminals 114 also communicate timing information and command signals to remote cell nodes 112. Remote cell nodes 112 serving important SCADA functions can be polled more frequently by an intermediate data terminal 114 to reduce network response time.

The first IDT receiver 521 receives the RCN-packet signal transmitted at the first carrier frequency from the remote cell node which was polled. Thus, after sequentially polling a plurality of remote cell nodes 112, the first IDT receiver 521 has received sequentially in time a plurality of RCN-packet signals.

The IDT memory 515 stores the received RCN-packet signals. The IDT processor 514 collates the NSM-packet signals embedded in the RCN-packet signals received from the plurality of remote cell notes, identifies duplicates of NSM-packet signals and deletes the duplicate NSM-packet signals, i.e., messages from network service modules that have the same message identification number.

In response to a second polling signal from a central data terminal 120, the second IDT transmitter 519 transmits a plurality of RCN-packet signals as an IDT-packet signal to the central data terminal 120. The second IDT transmitter 519 and second IDT receiver 522 may be embodied as a modem 523 or other device for communicating information over a communications medium 525 linking the intermediate data terminal with the central data terminal.

The intermediate data terminals 114 may include one or more directional IDT antennas 522. During the quiet time, the intermediate data terminal 114 is arranged to direct the IDT antenna 522 or antennas to each of the remote cell nodes 112 in turn and to transmit to the respective remote cell node 112 the first polling signal calling for the remote cell node 112 to transmit the stored information from the RCN memory 415. Use of more than one antenna can allow communication with more than one remote cell node 112 at a time. The remote cell node 112 is required, therefore, merely to transmit the information upon request in a collated package of the information which is transmitted to the intermediate data terminal 114 and collected for analysis.

Central Data Terminal

At the upper level of the hierarchy is a central data terminal 120 which acts as a network control center and data consolidation point. The central data terminal 120 controls basic network operation, allowing it to make global decisions regarding network organization. The central data terminal's purpose is to integrate information from a variety of network nodes into a coherent form which may be forwarded to different utility operating groups for specific applications. In addition to linking regional data terminals, the central data terminal 120 is connected to critical SCADA sites some of which may be co-located with intermediate data terminals 114 at sub-stations. At this level, there are relatively few communication links, so those required can be selected to optimize cost, speed and reliability. The transmission between the central data terminal 120 and the plurality of intermediate data terminals 114 is carried out using a communications medium 525 such as telephone lines, T1 carriers, fiber optic channels, coaxial cable channels, microwave channels, or satellite links.

Figure 11:
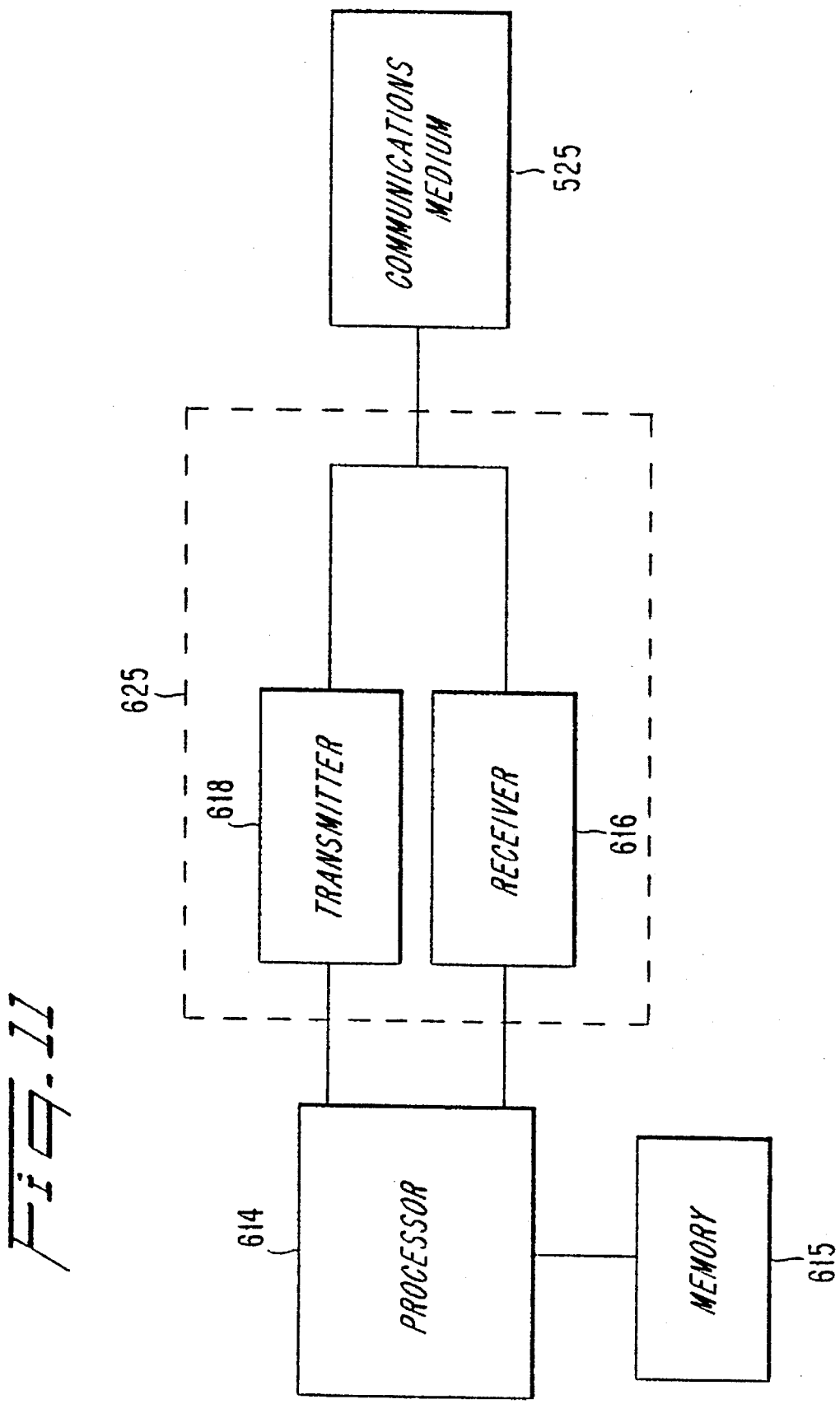
FIG. 11 is a central data terminal block diagram.

As illustratively shown in FIG. 11, the central data terminal (CDT) 120 includes CDT-transmitter means, CDT-receiver means, CDT-processor means and CDT-memory means. The CDT-transmitter means, CDT-receiver means, CDT-processor means and CDT-memory means may be embodied as a CDT transmitter 618, CDT receiver 616, CDT processor 614 and CDT memory 615, respectively. The CDT transmitter 618 and CDT receiver 616 are coupled to the communications medium 525. The CDT processor 614 is coupled to the CDT transmitter 618, CDT receiver 616 and CDT memory 615. The CDT transmitter 618 and CDT receiver 616 may be a modem 625 or other device suitable for communicating information over the communications medium 525 between the central data terminal 120 and each intermediate data terminal 114.

The CDT transmitter 618 transmits, sequentially in time, the second polling signal using a second polling access protocol to the plurality of intermediate data terminals 114. The CDT receiver 616 receives a plurality of IDT-packet signals. The CDT processor 614 decodes the plurality of IDT-packet signals as a plurality of NSM data. The CDT processor 614 also identifies duplicates of NSM data and deletes the duplicate NSM data. The CDT memory 615 stores the NSM data in a data base. The NSM data is outputted, analyzed or processed as desired.

Utility Overview

The performance of the network is in large part determined by the network service module 110 to remote cell node 112 link performance, which is defined by the network service module message loss rate. The network architecture is designed to minimize the network service module message loss rate, which is defined as the fraction of transmitted network service module messages which are not received by the remote cell nodes. The two issues that affect the message loss rate are:

1. relatively large and varying pathloss which is caused by the nature of the urban propagation environment; and
2. simultaneous message transmissions, or collisions, which are a problem for any multiple-access system.

The issue of large and varying pathloss is resolved through the use of:

1. transmit power adjustment;
2. path redundancy, controlled by the remote cell node grid spacing; and
3. multiple transmissions per day.

The collision issue is resolved using:

1. path redundancy, controlled by the remote cell node grid spacing;
2. multiple transmission per day;
3. partitioning of traffic according to priority; and
4. capture effect.

Remote cell node spacing can be selected to control the path redundancy, thus leading to an adjustable level of performance. Notice that path redundancy and multiple transmission per day are used to resolve both issues, and thus are principle features of the wide area communications network. The effect of collisions is minimal, so the probability of receiving a packet any time during the day is maintained at exceptionally high levels.

The link budget contains all of the gains and losses between the network service module power amplifier and the remote cell node receiver, and is used to calculate the maximum pathloss which can be allowed on any link. The minimum receivable signal at the remote cell node is estimated as $-115$ dBm, which is equal to the sum of the noise floor and the carrier to noise level which is required in order to receive the message (10 dB).

Every network service module has many remote cell nodes within receiving range, which increases the reliability of packet reception. When a network service module transmits, it has the potential to be received by many remote cell nodes. Some of the remote cell nodes are in shadow fading zones and do not receive the signal whereas others have an increased signal due to shadowing.

Even though some of the remote cell nodes 112 are quite far from the network service module 110, and thus the average pathloss is below the maximum allowed limit, it is still possible to receive the network service module if the signal level fluctuations, shadowing, multipathing, etc., contribute enough to the signal level. Similarly, some remote cell nodes which are close to the network service module do not hear the network service module because the signal variations decrease the signal network level by a significant amount.

During the life of the system, the urban landscape changes due to building construction and demolition and foliage growth. These changes in landscape affect the network service module-remote cell node links, causing some remote cell nodes to no longer receive a particular network service module transmission while new remote cell nodes will receive that network service module transmission. For each link that is no longer available it is expected that a new link becomes operational.

Figure 12:
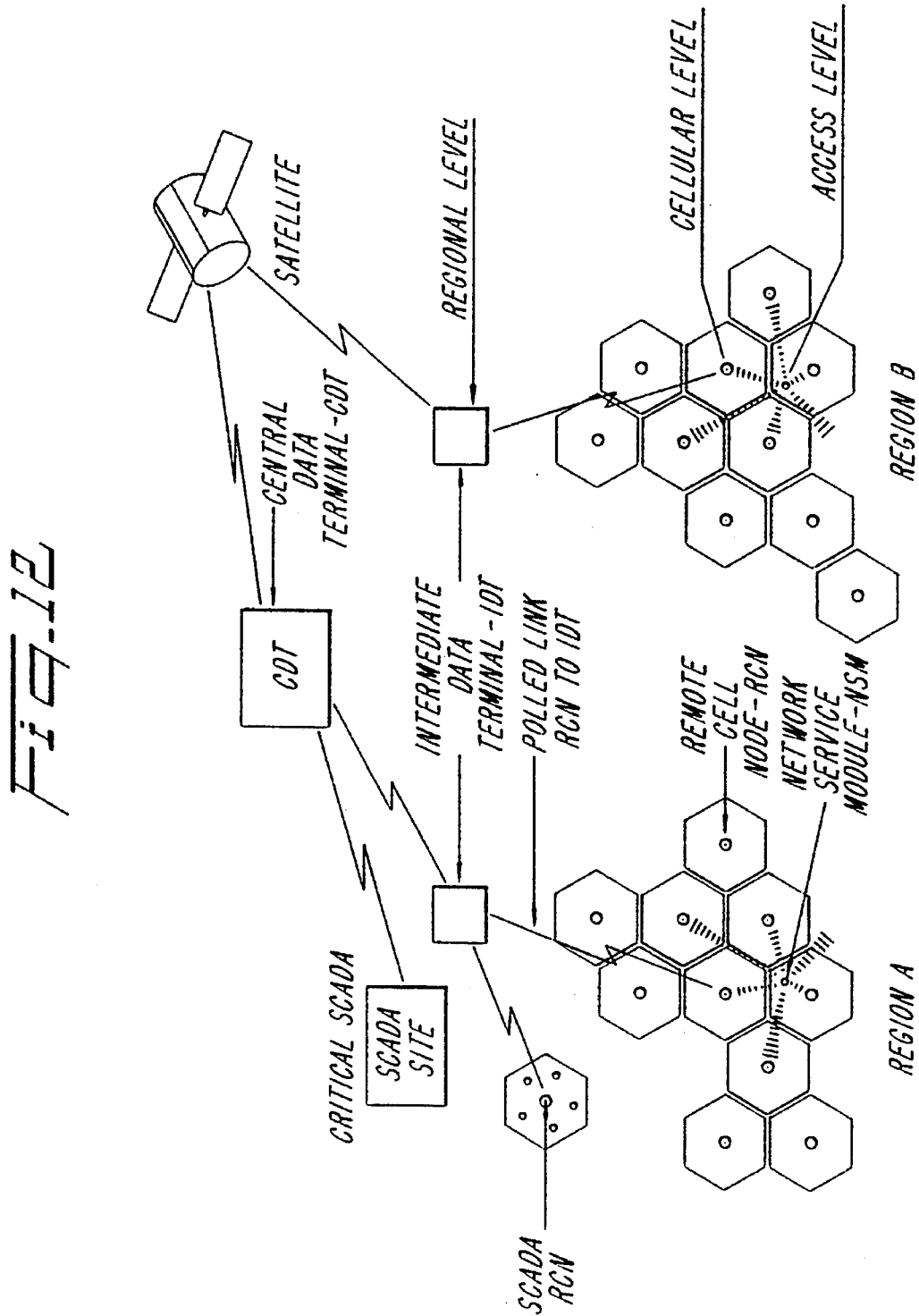
FIG. 12 shows the configuration of the communications network for serving widely separated geographic areas.

The wide area communications network can readily and cost effectively expand to support new hardware and application software growth scenarios. The wide area communications network can be implemented in those regions of the user's service territory and for those services which are most needed on an implementation plan which is not affected by geographic distribution. FIG. 12 illustrates the configuration of the wide area communications network for serving widely separated geographic areas. This includes the provision of wide area communications network services to isolated smaller communities via satellite, fiber optic, microwave or other back-bone network. Due to the unique nature of the wide area communications network's single channel, microcellular scattering propagation concept, it is immune to traditional radio problems such as fading, nulls, multipath, and lack of line of sight typical of mountainous, hilly, valley or high density urban setting.

The wide area communications network supports a broad range of monitoring, verifiable control, and fast response transaction applications. A number of these application needs are and continue to be identified by utilities. Due to the standardized network interface protocol and message packet configuration, the wide area communications network is able to readily augment its service offerings in either new hardware or software. The wide area communications network offers not only specialized network service modules for electric, gas and water meters but also provides a series of generic modules with industry standard in/output interfaces for contact closure, voltage or current sensing. This allows a variety of vendors to incorporate a wide area communications network communication interface into their own products, be they fuses, alarms, temperature sensors, etc.

The wide area communications network can provide a single integrated data channel for other utility operational applications. Some of these applications are hardware oriented but many are application software oriented. They involve the generation of new value-added information reports or services. Although some are primarily for use by the utility, many of them could be offered for sale to the customer, thus resulting in a new revenue stream for the utility.

The wide area communications network can support the expansion of SCADA due to its highly reliable wireless communication capabilities. Many utilities would like to add instrumental monitoring points to their SCADA, however, the wiring costs or difficulties often associated with such expansion prohibits SCADA growth at a sub-station or other site. Generic network service modules could be used to solve these problems.

The hierarchical design of the wide area communications network allows the customer to service an arbitrarily large contiguous or non-contiguous geographic area, as shown in FIG. 12, containing many applications and a large number of end points.

The key issues related to expansion are:
1. The size and arrangement of the geographic area;
2. The number of end points which can be serviced; and
3. The ease with which the number of applications can be increased.

The hierarchical design of the network allows non-contiguous areas to be serviced over a wide geographic area. Separate areas have their own intermediate data terminal communicating with the central data terminal. Data from non-contiguous areas would be transferred at the central data terminal level.

As the number of end points increases, either due to an increase in the number of applications in a geographic area or due to an increase in the size of the geographic area being serviced, the network traffic increases. The amount of additional traffic created depends on the type of application being added. Traffic increases in the wide area communications network are dealt with through hardware expansion at the central data terminal and by installation of additional intermediate data terminals in the new area. FIG. 13 illustrates a typical communications network with gradual growth in the number of areas served.

As the number of end points increases, another issue of concern is the identification of the message source. The wide area communications network of the present invention provides over one trillion serial numbers for each type of service module, which allows unique module identification over the life of the system.

As the number of applications increases, the amount of traffic from a given square mile is assumed to also increase. Simulations to the present time have indicated that more than 20,000 end points can be serviced per square mile, with this maximum number depending on the details of remote cell node deployment, house density and message reporting frequency. A dense urban area with 35 ft. by 100 ft. lots contains approximately 5000 homes per square mile.

Centralized control of wide area communications network is achieved by allowing the central data terminal to have access to network status data, which it uses to make decisions regarding network optimization. These decisions are downloaded to the intermediate data terminals and remote cell nodes as required.

Centralized traffic control is achieved at the remote cell node and intermediate data terminal levels by using priority tables, message storage instructions and alarm storage instructions. The structure of the priority tables is described as follows.

In each message that is transferred through the system, there is a set of identification tags stating the message type and the source. The priority tables in the remote cell nodes and intermediate data terminals contain a listing of all identification tags in the system the priority tables are first installed at the time of deployment, but can be updated from the central data terminal as required. During the network operational period there may be a need to change message priorities, which can then be accomplished with minimal impact on the network traffic.

Control of the alarm traffic within the network requires another table because alarm reporting generates higher traffic levels for a short period of time. This bursty traffic generation can lead to congestion problems, and so an alarm instruction table allows the central data terminal to clear alarm messages out of remote cell node and intermediate data terminal buffers at the end of the alarm. This priority table also allows the utility to tailor the alarm traffic delay to suit its particular needs.

Both the priority tables and the alarm instructions are used by the message storage instruction module to properly manage traffic on the network. The message storage instructions maintain the message queue, ensure that response times are within specification, and transmit performance data to the central data terminal to be used for network control.

The network service modules transmit messages to the remote cell nodes, which then use the tables discussed above to organize the message queue. All messages reach the application switch with the specified delay. The central data terminal downloads data to the three control modules and tables as required.

It will be apparent to those skilled in the art that various modifications can be made to the communications network for collecting data from remote data generating stations of the instant invention without departing from the scope or spirit of the invention, and it is intended that the present invention cover modifications and variations of the communications network provided they come within the scope of the appended claims and their equivalents.

What is claimed is:

1. A communications network for collecting a plurality of network service module (NSM) data generated by a plurality of physical devices located within a geographic area, comprising:

a plurality of network service modules, with each network service module coupled to a respective physical device generating respective NSM data, with each network service module including an NSM receiver for receiving a command signal, an NSM controller responsive to the received command signal for setting a carrier frequency, and an NSM transmitter for transmitting by wireless radio at the carrier frequency the respective NSM data from the respective physical device as an NSM-packet signal at a time pseudorandomly selected within a predetermined time period;

a plurality of remote cell nodes (RCN) located within the geographic area and spaced, with each network service module of said plurality of network service modules within a range of at least two remote cell nodes of said plurality of remote cell nodes, for simultaneously receiving the transmitted NSM-packet signal by said at least two remote cell nodes of said plurality of remote cell nodes, with each remote cell node including an RCN transmitter for transmitting by wireless radio the command signal;

an RCN receiver for receiving a multiplicity of NSM-packet signals transmitted from a multiplicity of network service modules, respectively, with the multiplicity of network service modules including a subset of said plurality of network service modules; and an RCN memory for storing the received multiplicity of NSM-packet signals, with said RCN transmitter responsive to a first polling signal for transmitting by wireless radio the stored multiplicity of NSM-packet signals as an RCN-packet signal;

a plurality of intermediate data terminals (IDT), with each intermediate data terminal including a first IDT transmitter for transmitting by wireless radio the first polling signal using a first polling-access protocol to each of said plurality of remote cell nodes;

a first IDT receiver for receiving a multiplicity of RCN-packet signals transmitted from a multiplicity of remote cell nodes, respectively, with the multiplicity of remote cell nodes including a subset of said plurality of remote cell nodes;

an IDT memory for storing the received multiplicity of RCN-packet signals;

a second IDT receiver for receiving a second polling signal; and a second IDT transmitter, responsive to the second polling signal, for transmitting the stored multiplicity of RCN-packet signals as an IDT-packet signal; and a central data terminal (CDT) having a CDT transmitter for transmitting the second polling signal using a second polling access protocol to said plurality of intermediate data terminals, a CDT receiver for receiving a plurality of IDT-packet signals, a CDT processor for decoding the plurality of IDT-packet signals as the plurality of NSM data, and a CDT memory for storing the plurality of NSM data in a data base.

2. The communications network as set forth in claim 1 wherein the first IDT transmitter of each of the plurality of intermediate data terminals includes frequency controlling means for controlling and changing the carrier frequency.

3. The communications network as set forth in claim 2 wherein the frequency controlling means includes a synthesizer.

4. A communications network for collecting a plurality of network service module (NSM) data generated by a plurality of physical devices located within a geographic area, comprising:

a plurality of network service modules, with each network service module of said plurality of network service modules including NSM-transmitter means for transmitting by wireless radio respective NSM data generated by a respective physical device as an NSM-packet signal at a time pseudorandomly selected within a predetermined time period;

a plurality of remote cell nodes (RCN) located within the geographic area and spaced, with each network service module of the plurality of network service modules within a range of at least two of said plurality of remote cell nodes, for receiving the transmitted NSM-packet signal by said at least two remote cell nodes, with each remote cell node including RCN-receiver means for receiving a multiplicity of NSM-packet signals transmitted from a multiplicity of network service modules, respectively, with the multiplicity of network service modules including a subset of said plurality of network service modules;

RCN-memory means for storing the received multiplicity of NSM-packet signals; and RCN-transmitter means, responsive to a first polling signal, for transmitting the stored multiplicity of NSM-packet signals as an RCN-packet signal;

a plurality of intermediate data terminals (IDT), with each intermediate data terminal including IDT-transmitter means for transmitting the first polling signal to said plurality of remote cell nodes;

IDT-receiver means for receiving a multiplicity of RCN-packet signals transmitted from a multiplicity of remote cell nodes, respectively, with the multiplicity of remote cell nodes including a subset of said plurality of remote cell nodes;

IDT-memory means for storing the received multiplicity of RCN-packet signals, with said IDT-transmitter means responsive to a second polling signal for transmitting the stored multiplicity of RCN-packet signals as an IDT-packet signal; and a central data terminal (CDT) having CDT-transmitter means for transmitting the second polling signal to said plurality of intermediate data terminals, CDT-receiver means for receiving a plurality of IDT-packet signals, CDT-processing means for decoding the plurality of IDT-packet signals as the plurality of NSM data, and CDT-memory means for storing the plurality of NSM data in a data base.

5. The communications network as set forth in claim 4 wherein each of said network service modules further includes:

NSM-receiver means for receiving a command signal transmitted from at least one of said plurality of remote cell nodes; and NSM-processor means, responsive to the command signal, for setting a carrier frequency of said NSM-transmitter means and updating an internal clock.

6. The communications network as set forth in claim 4 wherein each of said network service modules further includes:

NSM-processor means, responsive to detecting an alarm condition, for generating an alarm signal;

said NSM-transmitter means, responsive to said alarm signal, for transmitting the alarm signal in an NSM-packet signal;

said RCN-receiver means, responsive to receiving the alarm signal, for causing said RCN-transmitter means to transmit an RCN-packet signal having the alarm signal; and said IDT-receiver means, responsive to receiving the RCN-packet signal having the alarm signal, for causing said IDT-transmitter means to transmit an IDT-packet signal having the alarm signal.

7. The communications network as set forth in claim 4 wherein said plurality of physical devices includes a plurality of electricity meters, each of said plurality of electricity meters coupled to a respective one of said plurality of network service modules, for generating respective NSM data.

8. The communications network as set forth in claim 4 wherein said plurality of physical devices includes a plurality of water meters, each of said plurality of water meters coupled to a respective one of said plurality of network service modules, for generating respective NSM data.

9. The communications network as set forth in claim 4 wherein said plurality of physical devices includes a plurality of gas meters, each of said plurality of gas meters coupled to a respective one of said plurality of network service modules, for generating respective NSM data.

10. The communications network as set forth in claim 4 wherein the IDT-transmitter means, responsive to receiving an RCN-packet signal from a respective one of the multiplicity of remote cell nodes, sends an acknowledgement signal to the respective one of the multiplicity of remote cell nodes.

11. The communications network as set forth in claim 10 wherein the respective one of the plurality of remote cell nodes, responsive to receiving the acknowledgement signal, retains the stored multiplicity of NSM-packet signals in the RCN-memory means until additional NSM-packet signals are received from said multiplicity of network service modules, and the respective one of the plurality of remote cell nodes overwrites the stored multiplicity of NSM-packet signals.

12. The communications network as set forth in claim 4 wherein said CDT-processing means correlates the plurality of NSM-packet signals embedded in the plurality of IDT-packet signals.

13. The communications network as set forth in claim 12 wherein said CDT-processing means identifies a duplicate NSM-packet signal within the plurality of NSM-packet signals embedded in the plurality of IDT-packet signals.

14. The communications network as set forth in claim 4 wherein said CDT-processing means identifies a duplicate NSM-packet signal within the plurality of NSM-packet signals embedded in the plurality of IDT-packet signals.

15. The communications network as set forth in claim 14 or 13 wherein said CDT-processing means deletes the duplicate NSM-packet signal.

16. The communications network as set forth in claim 4 wherein each of said plurality of intermediate data terminals includes directional antenna means for transmitting in turn the first polling signal to said plurality of remote cell nodes.

17. The communications network as set forth in claim 4 wherein each of said plurality of physical devices includes a disk for rotating to measure data and for generating respective NSM data from the data measured.

18. The communications network as set forth in claim 17 wherein each of said plurality of physical devices includes a reverse sensor for detecting a reverse rotation of the respective disk and for generating respective NSM data from the reverse rotation detected.

19. The communications network as set forth in claim 4 wherein each of said plurality of physical devices includes a housing for housing the respective physical device, and a tilt sensor for detecting a movement of said housing and for generating respective NSM data from the movement detected.

20. The communications network as set forth in claim 19 wherein said plurality of physical devices includes a plurality of tilt sensors for detecting a movement of a respective one of the plurality of housings.

21. The communications network as set forth in claim 4 wherein each of said plurality of physical devices includes a field sensor for detecting a presence of an electric field and for generating respective NSM data from the electric field presence detected.

22. The communications network as set forth in claim 4 wherein each of said plurality of physical devices includes an acoustic sensor for detecting sounds and for generating respective NSM data from the sound detected.

23. The communications network as set forth in claim 4 wherein each of said plurality of physical devices includes a magnetic sensor for detecting a presence of a magnetic field and for generating respective NSM data from the magnetic field presence detected.

24. The communications network as set forth in claim 4 wherein each of said plurality of physical devices includes a heat sensor for detecting a temperature and for generating respective NSM data from the temperature detected.

25. The communications network as set forth in claim 4 wherein each of said plurality of physical devices includes a battery level sensor for detecting a battery level and for generating respective NSM data from the battery level detected.

26. The communications network as set forth in claim 4 wherein each of said plurality of physical devices includes a consumption sensor for detecting a value of consumption and for generating respective NSM data from the consumption value detected.

27. The communications network as set forth in claim 4 wherein each of the plurality of physical devices includes a cover sensor for detecting a continual presence of a cover and for generating respective NSM data from the cover presence detected.

28. The communications network as set forth in claim 27 wherein the cover includes a reflective strip, and wherein the cover sensor includes:
- a light emitting diode for generating a light beam to reflect off of the reflective strip; and
- a photo diode for detecting the reflected light beam.

29. The communications network as set forth in claim 4 wherein the IDT-transmitter means sends a plurality of communications signals to the plurality of remote cell nodes.

30. The communications network as set forth in claim 29, wherein at least a multiplicity of remote cell nodes receives the plurality of communications signals from the IDT-transmitter means.

31. A method for collecting a plurality of network service module (NSM) data generated by a plurality of physical devices coupled to a plurality of network service modules, respectively, located within a geographic area, by a plurality of remote cell nodes (RCN) located within the geographic area and spaced with each network service module of the plurality of network service modules within a range of at least two of said plurality, of remote cell nodes, for simultaneously receiving the plurality of NSM data by said at least two remote cell nodes, comprising the steps of:
- transmitting by wireless radio respective NSM data from each of the plurality of physical devices as an NSM-packet signal at a time selected pseudorandomly;
- receiving, at each remote cell node (RCN), a multiplicity of NSM-packet signals transmitted from a multiplicity of network service modules, respectively, with the multiplicity of network service modules including a subset of said plurality of network service modules;
- storing the received multiplicity of NSM-packet signals received at each of the plurality of remote cell nodes;
- polling the plurality of remote cell nodes with a plurality of polling signals, respectively, from an intermediate data terminal;
- transmitting from each of the plurality of remote cell nodes, responsive to the plurality of polling signals, the stored multiplicity of NSM-packet signals as a plurality of RCN-packet signals, respectively;
- receiving the plurality of RCN-packet signals at the intermediate data terminal (IDT);
- storing the received plurality of RCN-packet signals at the intermediate data terminal;
- transmitting, responsive to a second polling signal, from a plurality of intermediate data terminals, the plurality of stored RCN-packet signals as a plurality of IDT-packet signals, respectively; and
- receiving the plurality of IDT-packet signals at a central data terminal (CDT).

32. The method as set forth in claim 31 further comprising the steps of:
- sending an acknowledgement signal to a respective one of the plurality of remote cell nodes;
- receiving the acknowledgement signal;
- retaining the stored multiplicity of NSM-packet signals;
- receiving additional NSM-packet signals from the multiplicity of network service modules; and
- overwriting the retained stored multiplicity of NSM-packet signals.

33. The method as set forth in claim 31, further comprising the steps of:
- correlating the multiplicity of NSM-packet signals;
- identifying a duplicate NSM-packet signal from the multiplicity of NSM-packet signals;
- retaining the duplicate NSM-packet signal;
- receiving additional NSM-packet signals from the multiplicity of network service modules; and
- overwriting the duplicate NSM-packet signal.

34. The method as set forth in claim 31, further comprising the step of:
- sending a plurality of communications signals to the plurality of remote cell nodes.

35. The method as set forth in claim 34, further comprising the step of:
- receiving the plurality of communications signals at a multiplicity of remote cell nodes.

36. A communications network for collecting network service module (NSM) data generated by a plurality of physical devices located within a geographic area, comprising:
- a plurality of network service modules, with each network service module of said plurality of network service modules coupled to a respective physical device of said plurality of physical devices, with each network service module of said plurality of network service modules including an NSM transmitter for transmitting by wireless radio the respective NSM data from the respective physical device as an NSM-packet signal;
- a plurality of remote cell nodes (RCN) located within the geographic area and spaced with each network service module of said plurality of network service modules within a range of at least one remote cell node, with each remote cell node including an RCN receiver for receiving a multiplicity of NSM-packet signals transmitted from a multiplicity of network service modules, with the multiplicity of network service modules including a subset of the plurality of network service modules, and RCN-transmitter means for transmitting the multiplicity of NSM-packet signals as an RCN-packet signal; and
- a central data terminal (CDT) having CDT-receiver means for receiving a plurality of RCN-packet signals, a CDT processor for decoding the plurality of RCN-packet signals as the NSM data, and a CDT memory for storing the NSM data in a data base.

37. The communications network as set forth in claim 39 wherein said IDT transmitter includes frequency controlling means for controlling and changing the carrier frequency.

38. The communications network as set forth in claim 39 wherein the frequency controlling means includes a synthesizer.

39. A communications network for collecting network service module (NSM) data generated by a plurality of physical devices located within a geographic area, comprising:
- a plurality of network service modules for generating a plurality of NSM-packet signal, respectively, with each network service module including NSM-transmitter means for transmitting by wireless radio respective NSM data generated by a respective physical device as an NSM-packet signal;
- a plurality of remote cell nodes (RCN) located within the geographic area and spaced with each network service module of the plurality of network service modules within a range of at least two remote cell nodes for receiving a transmitted NSM-packet signal by said at least two remote cell nodes, with each remote cell node including RCN-receiver means for receiving a NSM-packet signal transmitted from a network service module, RCN-memory means for storing a multiplicity of NSM-packet signals, and RCN-transmitter means for transmitting the stored multiplicity of NSM-packet signals from the RCN-memory means as an RCN-packet signal;

an intermediate data terminal (IDT) including IDT-receiver means for receiving an RCN-packet signal transmitted from a remote cell node, IDT-memory means for storing a multiplicity of RCN-packet signals, and IDT-transmitter means for transmitting the stored multiplicity of RCN-packet signals as an IDT-packet signal; and a central data terminal (CDT) having CDT-receiver means for receiving a plurality of IDT-packet signals, CDT-processing means for decoding the plurality of IDT-packet signals as a plurality of NSM data, and CDT-memory means for storing the plurality of NSM data in a data base.

40. The communications network as set forth in claim 39 wherein each of said network service modules includes:

NSM-receiver means for receiving a command signal transmitted from one of said plurality of remote cell nodes; and NSM-processor means responsive to the command signal for setting a carrier frequency of said NSM-transmitter means and updating an internal clock.

41. The communications network as set forth in claim 39, wherein;

each of said network service modules further includes

NSM-processor means, responsive to detecting an alarm condition, for generating an alarm signal, with said NSM-transmitter means, responsive to said alarm signal, transmitting an NSM-packet signal having said alarm signal;

each of said remote cell nodes further includes

RCN-processor means, responsive to receiving the NSM-packet signal having the alarm signal, for causing said RCN-transmitter means to transmit an RCN-packet signal having the alarm signal; and said intermediate data terminal further includes IDT-processor means, responsive to receiving the RCN-packet signal having the alarm signal, for causing said IDT-transmitter means to transmit an IDT-packet signal having the alarm signal.

42. The communications network as set forth in claim 39 wherein said IDT-transmitter means, responsive to receiving an RCN-packet signal from a respective one of the plurality of remote cell nodes, sends an acknowledgement signal to the respective one of the plurality of remote cell nodes.

43. The communications network as set forth in claim 42 wherein the respective one of the plurality of remote cell nodes, responsive to receiving the acknowledgement signal, retains the stored multiplicity of NSM-packet signals in the RCN-memory means until additional NSM-packet signals are received from said multiplicity of network service modules, and the respective one of the plurality of remote cell nodes overwrites the stored multiplicity of NSM-packet signals.

44. The communications network as set forth in claim 39 wherein said CDT-processing means correlates the plurality of NSM-packet signals.

45. The communications network as set forth in claim 44 wherein said CDT-processing means identifies a duplicate NSM-packet signal among the plurality of NSM-packet signals.

46. The communications network as set forth in claim 39 wherein said CDT-processing means identifies a duplicate NSM-packet signal among the plurality of NSM-packet signals.

47. The communications network as set forth in claim 46 wherein said CDT-processing means deletes the duplicate NSM-packet signal from the plurality of NSM-packet signals.

48. The communications network as set forth in claim 39 wherein the IDT-transmitter means sends a plurality of communications signals to a remote cell node.

49. The communications network as set forth in claim 48, wherein the plurality of remote cell nodes receives the plurality of communications signals from the IDT-transmitter means.

50. The communications network as set forth in claim 36 or 39 with each of said plurality of physical devices including an electricity meter for generating respective NSM data.

51. The communications network as set forth in claim 36 or 39 with each of said plurality of physical devices including a water meter for generating respective NSM data.

52. The communications network as set forth in claim 36 or 39 with each of said plurality of physical devices including a gas meter for generating respective NSM data.

53. The communications network as set forth in claim 39 wherein said intermediate data terminal includes antenna means for transmitting in turn a polling signal to each of said plurality of remote cell nodes.

54. The communications network as set forth in claim 36 or 39 wherein each of said plurality of physical devices includes a disk for rotating to measure data.

55. The communications network as set forth in claim 36 or 39 wherein:

each of said plurality of physical devices includes a housing for housing a respective one of the plurality of physical devices; and each of said plurality of physical devices includes a tilt sensor for detecting a movement of a respective one of the plurality of housings.

56. The communications network as set forth in claim 36 or 39 wherein each of said plurality of physical devices includes a field sensor for detecting a presence of an electric field.

57. The communications network as set forth in claim 36 or 39 wherein each of said plurality of physical devices includes an acoustic sensor for detecting a sound.

58. The communications network as set forth in claim 36 or 39 wherein each of said plurality of physical devices includes a magnetic sensor for detecting a presence of a magnetic field.

59. The communications network as set forth in claim 36 or 39 wherein each of said plurality of physical devices includes a heat sensor for detecting a temperature.

60. The communications network as set forth in claim 36 or 39 wherein each of said plurality of physical devices includes a battery level sensor for detecting a battery level.

61. The communications network as set forth in claim 36 or 39 wherein each of said plurality of physical devices includes a consumption sensor for detecting a value of consumption.

62. The communications network as set forth in claim 54 wherein each of said plurality of physical devices includes a reverse sensor for detecting a reverse rotation of a respective disk.

63. The communications network as set forth in claim 36 or 39 wherein each of the plurality of physical devices includes a cover sensor for detecting a continual presence of a cover.

64. The communications network as set forth in claim 63 wherein the cover includes a reflective strip, and wherein the cover sensor includes:

a light emitting diode for generating a light beam to reflect off of the reflective strip; and a photo diode for detecting the reflected light beam.

65. A method for collecting network service module (NSM) data generated by a plurality of physical devices coupled to a plurality of network service modules, respectively, located within a geographic area, by a plurality of remote cell nodes located within the geographic area and spaced with each network service module of the plurality of network service modules within a range of at least two remote cell nodes for receiving NSM-data by said at least two remote cell nodes, comprising the steps of:

transmitting by wireless radio respective NSM data, generated by a respective physical device using a respective network service module, as an NSM-packet signal;

receiving at the plurality of remote cell nodes (RCN) a multiplicity of NSM-packet signals transmitted from a multiplicity of network service modules;

storing a multiplicity of NSM-packet signals at each of the plurality of remote cell nodes;

transmitting from each of the plurality of remote cell nodes the stored multiplicity of NSM-packet signals as a plurality of RCN-packet signals; and receiving the plurality of RCN-packet signals at a central data terminal (CDT).

66. The method as set forth in claim 65, further comprising the steps of:

sending an acknowledgement signal to a respective one of the plurality of remote cell nodes;

receiving the acknowledgement signal;

retaining the stored multiplicity of NSM-packet signals;

receiving additional NSM-packet signals from the multiplicity of network service modules; and overwriting the stored multiplicity of NSM-packet signals.

67. The method as set forth in claim 65, further comprising the steps of:

correlating the multiplicity of NSM-packet signals;

identifying a duplicate NSM-packet signal from the multiplicity of NSM-packet signals;

retaining the duplicate NSM-packet signal;

receiving additional NSM-packet signals from the multiplicity of network service modules; and overwriting the duplicate NSM-packet signal.

68. The method as set forth in claim 65, further comprising the step of:

sending a plurality of communications signals to a respective one of the plurality of remote cell nodes.

69. The method as set forth in claim 68, further comprising the step of:

receiving the plurality of communications signals at the plurality of remote cell nodes.

70. The method as set forth in claim 65 further comprising the steps of:

receiving a command signal transmitted from one of said plurality of remote cell nodes at one of the multiplicity of network service modules; and setting, in response to the command signal, a carrier frequency of a transmitter located at said network service module.

71. The method as set forth in 65 further comprising the steps of:

generating, in response to detecting an alarm condition at a network service module, an alarm signal;

transmitting the alarm signal in an NSM-packet signal; and transmitting, in response to receiving the NSM-packet signal having the alarm signal, an RCN-packet signal having the alarm signal.

72. The method as set forth in claim 65 further including the step of generating NSM data from said plurality of physical devices with a plurality of electricity meters, respectively.

73. The method as set forth in claim 65 further including the step of generating NSM data from said plurality of physical devices with a plurality of water meters, respectively.

74. The method as set forth in claim 65 further including the step of generating NSM data from said plurality of physical devices with a plurality of gas meters, respectively.

75. The method as set forth in claim 65 further comprising the steps of:

receiving an RCN-packet signal from a respective one of the plurality of remote cell nodes at the central data terminal; and sending an acknowledgement signal to the respective one of the plurality of remote cell nodes.

76. The method as set forth in claim 75 further comprising the steps of:

retaining, at the respective one of the plurality of remote cell nodes, the stored multiplicity of NSM-packet signals until additional NSM-packet signals are received from said multiplicity of network service modules; and overwriting, at the respective one of the plurality of remote cell nodes, the stored multiplicity of NSM-packet signals.

77. The method as set forth in claim 65 further comprising the steps of correlating, in time, the multiplicity of NSM-packet signals.

78. The method as set forth in claim 77 further comprising the step of identifying a duplicate NSM-packet signal from the multiplicity of NSM-packet signals.

79. The method as set forth in claim 65 further comprising the step of identifying a duplicate NSM-packet signal from the multiplicity of NSM-packet signals.

80. The method as set forth in claim 79, or 78 further comprising the step of deleting the duplicate NSM-packet signal from the multiplicity of NSM-packet signals.

81. The method as set forth in claim 65 further including the steps of:

housing each of the plurality of physical devices with a respective one of a plurality of housings; and detecting a movement of a respective one of the plurality of housings with a respective one of a plurality of tilt sensors.

82. The method as set forth in claim 65 further including the step for detecting the presence of an electric field with a field sensor at a network service module.

83. The method as set forth in claim 65 further including the step of detecting sounds with a respective one of a plurality of acoustic sensors, at a respective one of said plurality of physical devices.

84. The method as set forth in claim 65 further including the step of detecting the presence of a magnetic field, with a respective one of a plurality of magnetic field sensors, at a respective one of said plurality of physical devices.

85. The method as set forth in claim 65 further including the step of detecting a temperature, with a respective one of a plurality of temperature sensors, of g respective one of said plurality of physical devices.

86. The method as set forth in claim 65 further including the step of detecting a battery level, using a respective one of a plurality of battery level sensors, of a respective one of said plurality of physical devices.

87. The method as set forth in claim 65 further including the step of detecting a value of consumption, using a respective one of a plurality of consumption sensors, of a respective one of said plurality of physical devices.

88. The method as set forth in claim 65 further including the step of detecting a reverse rotation of a respective one of a plurality of disks at a respective one of said plurality of physical devices.

89. The method as set forth in claim 65 further including the step of detecting, using a respective one of a plurality of cover sensors, a continual presence of a cover on a respective one of the plurality of physical devices.

90. The method as set forth in claim 89 wherein the cover includes a reflective strip, further including the steps of:

generating a light beam to reflect off of the reflective strip; and detecting the reflected light beam.

91. A method for collecting a plurality of network service module (NSM) data generated by a plurality of physical devices coupled to a plurality of network service modules, respectively, located within a geographic area, by a plurality of remote cell nodes (RCN) located within the geographic area and spaced with each network service module of the plurality of network service modules within a range of at least two of said plurality of remote cell nodes, for simultaneously receiving the plurality of NSM data by said at least two remote cell nodes, comprising the steps of:

transmitting by wireless radio respective NSM data from each of the plurality of physical devices as an NSM-packet signal at a time selected pseudorandomly;

receiving, at each remote cell node (RCN), a multiplicity of NSM-packet signals transmitted from a multiplicity of network service modules, respectively, with the multiplicity of network service modules including a subset of said plurality of network service modules;

storing the received multiplicity of NSM-packet signals at each of the plurality of remote cell nodes;

polling, from a plurality of intermediate data terminals (IDT) using a plurality of polling signals, respectively, the plurality of remote cell nodes, with each of the plurality of intermediate data terminals polling a multiplicity of remote cell nodes, the multiplicity of remote cell nodes including a subset of the plurality of remote cell nodes;

transmitting from each of the plurality of remote cell nodes, responsive to the plurality of polling signals, the stored multiplicity of NSM-packet signals as an RCN-packet signal;

receiving a multiplicity of RCN-packet signals at each of the plurality of intermediate data terminals, with the multiplicity of RCN-packet signals including a subset of the plurality of RCN-packet signals;

storing the received multiplicity of RCN-packet signals at each of the plurality of intermediate data terminals;

polling, from a central data terminal using a second polling signal, the plurality of intermediate data terminals;

transmitting from each of the plurality of intermediate data terminals, responsive to the second polling signal, the multiplicity of stored RCN-packet signals as an IDT-packet signal, respectively;

receiving a plurality of IDT-packet signals at the central data terminal; and decoding, at the central data terminal, the plurality of IDT-packet signals as the plurality of NSM data.

92. The method as set forth in claim 91, further comprising, after the step of receiving a multiplicity of RCN-packet signals at each of the plurality of intermediate data terminals, the steps of:

sending an acknowledgement signal to a respective one of the multiplicity of remote cell nodes;

receiving, at the respective one of the multiplicity of remote cell nodes, the acknowledgement signal;

retaining, at the respective one of the multiplicity of remote cell nodes, the stored multiplicity of NSM-packet signals;

receiving, at the respective one of the multiplicity of remote cell nodes, additional NSM-packet signals from the multiplicity of network service modules; and overwriting the retained stored multiplicity of NSM-packet signals.

93. The method as set forth in claim 91, further comprising, after the step of receiving a multiplicity of RCN-packet signals at each of the plurality of intermediate data terminals, the steps of:

sending an acknowledgement signal to a respective one of the multiplicity of remote cell nodes;

receiving, at the respective one of the multiplicity of remote cell nodes, the acknowledgement signal; and deleting, by overwriting, the stored multiplicity of NSM-packet signals.

94. The method as set forth in claim 91, further comprising, after the step of receiving a multiplicity of RCN-packet signals at each of the plurality of intermediate data terminals, the steps of:

correlating the multiplicity of NSM-packet signals embedded in the multiplicity of RCN-packet signals;

identifying a duplicate NSM-packet signal within the multiplicity of NSM-packet signals; and deleting the duplicate NSM-packet signal.

95. The method as set forth in claim 91, further comprising, after the step of receiving, at each remote cell node, a multiplicity of NSM-packet signals, the steps of:

correlating the multiplicity of NSM-packet signals;

identifying a duplicate NSM-packet signal from the multiplicity of NSM-packet signals;

retaining the duplicate NSM-packet signal;

receiving additional NSM-packet signals from the multiplicity of network service modules; and overwriting the duplicate NSM-packet signal.

96. The method as set forth in claim 91 further comprising, after the step of receiving, at each remote cell node, a multiplicity of NSM-packet signals, the steps of:

correlating the multiplicity of NSM-packet signals;

identifying a duplicate NSM-packet signal from the multiplicity of NSM-packet signals; and duplicating, by overwriting, the duplicate NSM-packet signal.

97. The method as set forth in claim 91, further comprising, after the step of transmitting an RCN-packet signal, the steps of:

monitoring, by the plurality of remote cell nodes, the transmitted RCN-packet signal;

comparing, by a monitoring remote cell node, the transmitted RCN-packet signal to NSM data stored at the monitoring remote cell node;

identifying redundant NSM data; and cancelling the redundant NSM data.

98. The method as set forth in claim 91, further comprising, after the step of decoding, at the central data terminal, the plurality of IDT-packet signals as the plurality of NSM data, the steps of:

correlating the plurality of NSM data;

identifying duplicate NSM data within the plurality of NSM data; and deleting the duplicate NSM data.

99. A communications network for collecting a plurality of network service module (NSM) data generated by a plurality of physical devices located within a geographic area, comprising:

a plurality of network service modules for generating a plurality of NSM-packet signals, respectively, with each network service module including NSM-transmitter means for transmitting by wireless radio respective NSM data generated by a respective physical device as an NSM-packet signal;

a plurality of remote cell nodes (RCN) located within the geographic area and spaced with each network service module of the plurality of network service modules within a range of at least two remote cell nodes for receiving a transmitted NSM-packet signal by said at least two remote cell nodes, with each remote cell node including RCN-receiver means for receiving an NSM-packet signal transmitted from a network service module, RCN-memory means for storing the received NSM-packet signal, and RCN-transmitter means for transmitting the stored NSM-packet signal from the RCN-memory means as an RCN-packet signal;

an intermediate data terminal (IDT) including IDT-receiver means for receiving the RCN-packet signal transmitted from each remote cell node, IDT-memory means for storing the received RCN-packet signal, and IDT-transmitter means for transmitting the stored RCN-packet signal as an IDT-packet signal; and a central data terminal (CDT) having CDT-receiver means for receiving the IDT-packet signal, CDT-processing means for decoding the received IDT-packet signal as a plurality of NSM data, and CDT-memory means for storing the plurality of NSM data in a data base.

100. The communications network as set forth in claim 99, wherein:

each of said network service modules further includes NSM-processor means, responsive to detecting an alarm condition, for generating an alarm signal, with said NSM-transmitter means, responsive to the alarm signal, transmitting an NSM-packet signal having the alarm signal;

each of said remote cell nodes further includes RCN-processor means, responsive to receiving the NSM-packet signal having the alarm signal, for causing said RCN-transmitter means to transmit an RCN-packet signal having the alarm signal; and said intermediate data terminal further includes IDT-processor means, responsive to receiving the RCN-packet signal having the alarm signal, for causing said IDT-transmitter means to transmit an IDT-packet signal having the alarm signal.

101. The communications network as set forth in claim 99 with each of said plurality of physical devices including an electricity meter for generating respective NSM data.

102. The communications network as set forth in claim 99 with each of said plurality of physical devices including a water meter for generating respective NSM data.

103. The communications network as set forth in claim 99 with each of said plurality of physical devices including a gas meter for generating respective NSM data.

104. The communications network as set forth in claim 99 wherein said IDT-transmitter means, responsive to receiving the RCN-packet signal from a particular remote cell node, sends an acknowledgement signal to the particular remote cell node.

105. The communications network as set forth in claim 104 wherein the particular remote cell node, responsive to receiving the acknowledgement signal, retains the stored NSM-packet signal in a respective RCN-memory means until an additional NSM-packet signal is received from a network service module, and then the particular remote cell node deletes the stored NSM-packet signal.

106. The communications network as set forth in claim 99 wherein said CDT-processing means correlates the NSM data.

107. The communications network as set forth in claim 106 wherein said CDT-processing means identifies duplicate NSM data among the plurality of NSM data.

108. The communications network as set forth in claim 99 wherein said CDT-processing means identifies duplicate NSM data among the plurality of NSM data.

109. The communications network as set forth in claim 108 wherein said CDT-processing means deletes the duplicate NSM data.

110. The communications network as set forth in claim 99 wherein said IDT transmitter includes frequency controlling means for controlling and changing the carrier frequency.

111. The communications network as set forth in claim 99 wherein said intermediate data terminal includes antenna means for transmitting in turn a polling signal to each of said plurality of remote cell nodes.

112. The communications network as set forth in claim 99 wherein each of said plurality of physical devices includes disk for rotating to measure data.

113. The communications network as set forth in claim 112 wherein each of said plurality of physical devices includes a reverse sensor for detecting a reverse rotation of a respective disk.

114. The communications network as set forth in claim 99 wherein each of said plurality of physical devices includes a housing for housing a respective one of the plurality of physical devices; and a tilt sensor for detecting a movement of a respective one of the plurality of housings.

115. The communications network as set forth in claim 99 wherein each of said plurality of physical devices includes a field sensor for detecting a presence of an electric field.

116. The communications network as set forth in claim 99 wherein each of said plurality of physical devices includes an acoustic sensor for detecting a sound.

117. The communications network as set forth in claim 99 wherein each of said plurality of physical devices includes a magnetic sensor for detecting a presence of a magnetic field.

118. The communications network as set forth in claim 99 wherein each of said plurality of physical devices includes a heat sensor for detecting a temperature.

119. The communications network as set forth in claim 99 wherein each of said plurality of physical devices includes a battery level sensor for detecting a battery level.

120. The communications network as set forth in claim 99 wherein each of said plurality of physical devices includes a consumption sensor for detecting a value of consumption.

121. The communications network as set forth in claim 99 wherein each of the plurality of physical devices includes a cover sensor for detecting a continual presence of a cover.

122. A communications network for collecting a plurality of network service module (NSM) data generated by a plurality of physical devices located within a geographic area, comprising:

a plurality of network service modules, with each network service module of said plurality of network service modules including NSM-transmitter means for transmitting by wireless radio respective NSM data generated by a respective physical device as an NSM-packet signal at a time pseudorandomly selected within a predetermined time period;

a plurality of remote cell nodes (RCN) located within the geographic area and spaced, with each network service module of the plurality of network service modules within a range of at least two of said plurality of remote cell nodes, for receiving the transmitted NSM-packet signal by said at least two remote cell nodes, with each remote cell node including RCN-receiver means for receiving a multiplicity of NSM-packet signals transmitted from a multiplicity of network service modules, respectively, with the multiplicity of network service modules including a subset of said plurality of network service modules;

RCN-memory means for storing the received multiplicity of NSM-packet signals; and RCN-transmitter means, responsive to a first polling signal, for transmitting the stored multiplicity of NSM-packet signals as an RCN-packet signal;

a plurality of intermediate data terminals (IDT), with each intermediate data terminal including IDT-transmitter means for transmitting the first polling signal to said plurality of remote cell nodes;

IDT-receiver means for receiving a multiplicity of RCN-packet signals transmitted from a multiplicity of remote cell nodes, respectively, with the multiplicity of remote cell nodes including a subset of said plurality of remote cell nodes;

IDT-processing means for decoding the multiplicity of RCN-packet signals as a multiplicity of NSM-packet signals;

IDT-memory means for storing the received multiplicity of RCN-packet signals, with said IDT-transmitter means responsive to a second polling signal for transmitting the stored multiplicity of RCN-packet signals as an IDT-packet signal; and a central data terminal (CDT) having CDT-transmitter means for transmitting the second polling signal to said plurality of intermediate data terminals, CDT-receiver means for receiving a plurality of IDT-packet signals, CDT-processing means for decoding the plurality of IDT-packet signals as the plurality of NSM data, and CDT-memory means for storing the plurality of NSM data in a data base.

123. The communications network as set forth in claim 122 wherein said CDT-processing means correlates the plurality of NSM data.

124. The communications network as set forth in claim 122 or 123 wherein said CDT-processing means identifies duplicate NSM data from the plurality of NSM data.

125. The communications network as set forth in claim 124 wherein said CDT-processing means deletes the duplicate NSM data from the plurality of NSM data.

126. The communications network as set forth in claim 122 wherein said IDT-processing means correlates the multiplicity of NSM-packet signals.

127. The communications network as set forth in claim 126 wherein said IDT-processing means identifies a duplicate NSM-packet signal from the multiplicity of NSM-packet signals.

128. The communications network as set forth in claim 127 wherein said IDT-processing means deletes the duplicate NSM-packet signal from the multiplicity of NSM-packet signals.

129. The communications network as set forth in claim 122 wherein said IDT-processing means identifies duplicate NSM data from the plurality of NSM data.

130. The communications network as set forth in claim 122 wherein said RCN-processing means identifies redundant NSM data from the plurality of NSM data.

131. The communications network as set forth in claim 130 wherein said RCN-processing means cancels the redundant NSM data from the plurality of NSM data.

132. A method for collecting network service module (NSM) data generated by a plurality of physical devices coupled to a plurality of network service modules, respectively, located within a geographic area, by a plurality of remote cell nodes located within the geographic area and spaced with each network service module of the plurality of network service modules within a range of at least two remote cell nodes for receiving NSM-data by said at least two remote cell nodes, comprising the steps of:

transmitting by wireless radio respective NSM data, generated by a respective physical device using a respective network service module, as an NSM-packet signal;

receiving at a remote cell node (RCN) the NSM-packet signal;

storing the NSM-packet signal;

receiving at the remote cell node a multiplicity of NSM-packet signals transmitted from a multiplicity of network service modules;

storing a plurality of NSM-packet signals at the remote cell node, the plurality of NSM-packet signals including the NSM-packet signal and the multiplicity of NSM-packet signals;

transmitting from the remote cell node the stored plurality of NSM-packet signals as an RCN-packet signal; and receiving the RCN-packet signal at a central data terminal (CDT).

133. The method as set forth in claim 132, further comprising the steps of:

sending an acknowledgement signal to the remote cell node;

receiving the acknowledgement signal at the remote cell node;

retaining the stored plurality of NSM-packet signals;

receiving additional NSM-packet signals from the multiplicity of network service modules; and overwriting the stored plurality of NSM-packet signals.

134. The method as set forth in claim 132, further comprising the steps of:

sending an acknowledgement signal to the remote cell node;

receiving, at the remote cell node, the acknowledgement signal; and deleting by overwriting, at the remote cell node, the stored plurality of NSM-packet signals.

135. The method as set forth in claim 132, further comprising the steps of:

correlating the multiplicity of NSM-packet signals;

identifying a redundant NSM-packet signal from the plurality of NSM-packet signals;

receiving additional NSM-packet signals from the multiplicity of network service modules; and deleting, by overwriting, the redundant NSM-packet signal with the additional received NSM-packet signals.

136. The method as set forth in claim 132, further comprising the steps of:

receiving a plurality of RCN-packet signals at the central data terminal;

correlating the NSM data embedded in the plurality of RCN-packet signals;

identifying redundant NSM data; and deleting the redundant NSM data.

137. The method as set forth in claim 132, further comprising the step of:

sending a plurality of communications signals to the remote cell node.

138. The method as set forth in claim 132, further comprising the step of:

sending a command signal to the remote cell node.

139. The method as set forth in claim 132, further comprising the steps of:

receiving a command signal, transmitted from the remote cell node, at one of the multiplicity of network service modules; and setting, in response to the command signal, a carrier frequency of a transmitter located at said network service module.

140. A method for collecting network service module (NSM) data generated by a plurality of physical devices coupled to a plurality of network service modules, respectively, located within a geographic area, by a plurality of remote cell nodes located within the geographic area and spaced with each network service module of the plurality of network service modules within a range of at least two remote cell nodes for receiving NSM-data by at least two remote cell nodes, comprising the steps of:

transmitting by wireless radio respective NSM data, generated by a respective physical device using a respective network service module, as an NSM-packet signal;

receiving, at a first remote cell node (RCN), the NSM-packet signal;

storing the NSM-packet signal at the first remote cell node;

receiving at the first remote cell node, a multiplicity of NSM-packet signals transmitted from a multiplicity of network service modules;

storing a plurality of NSM-packet signals at the first remote cell node, the plurality of NSM-packet signals including the NSM-packet signal and the multiplicity of NSM-packet signals;

transmitting, from the first remote cell node, the stored plurality of NSM-packet signals as an RCN-packet signal; and receiving the RCN-packet signal at a central data terminal (CDT).

141. The method as set forth in claim 132 or 140, further comprising the steps of:

correlating the plurality of NSM-packet signals;

identifying a redundant NSM-packet signal from the plurality of NSM-packet signals;

deleting the redundant NSM-packet signal.

142. The method as set forth in claim 140, further comprising the steps of:

sending an acknowledgement signal to the first remote cell node;

receiving, at the first remote cell node, the acknowledgement signal; and deleting by overwriting, at the first remote cell node, the stored plurality of NSM-packet signals.

143. The method as set forth in claim 140, further comprising the step of eavesdropping, by the second remote cell node, on the acknowledgement signal sent to the first remote cell node.

144. The method as set forth in claim 140, further comprising the steps of:

monitoring, by a second remote cell node, the RCN-packet signal transmitted by the first remote cell node;

comparing, by the second remote cell node, the transmitted RCN-packet signal to NSM data stored at the second remote cell node;

identifying redundant NSM data; and cancelling the redundant NSM data.

145. The method as set forth in claim 140, further comprising the steps of:

correlating the multiplicity of NSM-packet signals;

identifying a redundant NSM-packet signal from the plurality of NSM-packet signals;

receiving additional NSM-packet signals from the multiplicity of network service modules; and deleting, by overwriting, the redundant NSM-packet signal with the additional received NSM-packet signals.

146. A communications network for collecting a plurality of network service module (NSM) data generated by a plurality of physical devices located within a geographic area, comprising:

a plurality of network service modules, with each network service module coupled to a respective physical device generating respective NSM data, with each network service module including an NSM transmitter for transmitting by wireless radio at a carrier frequency the respective NSM data from the respective physical device as an NSM-packet signal at a time pseudorandomly selected within a predetermined time period;

a plurality of remote cell nodes (RCN) located within the geographic area and spaced, with each network service module of said plurality of network service modules within a range of at least two remote cell nodes of said plurality of remote cell nodes, for simultaneously receiving the transmitted NSM-packet signal by said at least two remote cell nodes of said plurality of remote cell nodes, with each remote cell node including an RCN receiver for receiving a multiplicity of NSM-packet signals transmitted from a multiplicity of network service modules, respectively, with the multiplicity of network service modules including a subset of said plurality of network service modules; and an RCN transmitter for transmitting by wireless radio the multiplicity of NSM-packet signals as an RCN-packet signal;

a plurality of intermediate data terminals (IDT), with each intermediate data terminal including an IDT receiver for receiving a multiplicity of RCN-packet signals transmitted from a multiplicity of remote cell nodes, respectively, with the multiplicity of remote cell nodes including a subset of said plurality of remote cell nodes; and an IDT transmitter for transmitting the multiplicity of RCN-packet signals as an IDT-packet signal; and a central data terminal (CDT) having a a CDT receiver for receiving a plurality of IDT-packet signals, a CDT processor for decoding the plurality of IDT-packet signals as the plurality of NSM data, and a CDT memory for storing the plurality of NSM data in a data base.

147. A method for collecting network service module (NSM) data generated by a plurality of physical devices coupled to a plurality of network service modules, respectively, located within a geographic area, by at least two remote cell nodes located within the geographic area, for transferring the NSM data to at least one intermediate data terminal (IDT), and for eliminating redundant NSM data, comprising the steps of:

transmitting by wireless radio respective NSM data, generated by a respective physical device using a respective network service module, as an NSM-packet signal;

receiving by a first remote cell node (RCN) the NSM-packet signal;

receiving by a second remote cell node (RCN) the NSM-packet signal;

storing, at the first remote cell node, the NSM-packet signal as part of a first stored multiplicity of NSM-packet signals;

storing, at the second remote cell node, the NSM-packet signal as part of a second stored multiplicity of NSM-packet signals;

polling the first remote cell node, from the intermediate data terminal, using a first polling signal;

transmitting, responsive to the first polling signal, the first stored multiplicity of NSM-packet signals as a first RCN-packet signal;

eavesdropping, by the second remote cell node, to the transmitted first RCN-packet signal;

receiving the transmitted first RCN-packet signal at the intermediate data terminal;

sending, responsive to receiving the transmitted first RCN-packet signal, an acknowledgement signal to the first remote cell node;

eavesdropping, by the second remote cell node, to the transmitted acknowledgement signal;

cancelling, at the second remote cell node, the NSM-packet signal from the second stored multiplicity of NSM-packet signals as a redundant signal;

polling the second remote cell node, from the intermediate data terminal, using a second polling signal;

transmitting, responsive to the second polling signal, the second stored multiplicity of NSM-packet signals as a second RCN-packet signal;

receiving the transmitted second RCN-packet signal at the intermediate data terminal; and sending, responsive to receiving the transmitted second RCN-packet signal, an acknowledgement signal to the second remote cell node.

148. The method as set forth in claim 147 further comprising the steps of:

decoding, at the intermediate data terminal, the first RCN-packet signal as a first plurality of NSM data;

decoding, at the intermediate data terminal, the second RCN-packet signal as a second plurality of NSM data;

identifying redundant NSM data; and deleting redundant NSM data.

149. A method for collecting network service module (NSM) data generated by a plurality of physical devices coupled to a plurality of network service modules, respectively, located within a geographic area, by at least two remote cell nodes located within the geographic area, for transferring NSM data to at least one intermediate data terminal (IDT), and for eliminating redundant NSM data, comprising the steps of:

transmitting by wireless radio respective NSM data, generated by a respective physical device using a respective network service module, as an NSM-packet signal;

receiving by a first remote cell node (RCN) the NSM-packet signal;

receiving by a second remote cell node (RCN) the NSM-packet signal;

storing, at the first remote cell node, the NSM-packet signal as part of a first stored multiplicity of NSM-packet signals;

storing, at the second remote cell node, the NSM-packet signal as part of a second stored multiplicity of NSM-packet signals;

transmitting, to the intermediate data terminal, the first stored multiplicity of NSM-packet signals as a first RCN-packet signal;

monitoring, by the second remote cell node, the transmitted first RCN-packet signal;

identifying redundant NSM data; and cancelling redundant NSM data.

150. The method as set forth in claim 149 wherein the step of identifying redundant NSM data includes the step of comparing the transmitted first RCN-packet signal to NSM data stored at the second remote cell node.

151. A method for collecting network service module (NSM) data generated by a plurality of physical devices coupled to a plurality of network service modules, respectively, located within a geographic area, by at least two remote cell nodes located within the geographic area, for transferring NSM data to at least one intermediate data terminal (IDT), and for eliminating redundant NSM data, comprising the steps of:

transmitting by wireless radio respective NSM data, generated by a respective physical device using a respective network service module, as an NSM-packet signal;

receiving by a first remote cell node (RCN) the NSM-packet signal;

receiving by a second remote cell node (RCN) the NSM-packet signal;

storing, at the first remote cell node, the NSM-packet signal as part of a first stored multiplicity of NSM-packet signals;

storing, at the second remote cell node, the NSM-packet signal as part of a second stored multiplicity of NSM-packet signals;

polling the first remote cell node, from the intermediate data terminal, using a first polling signal;

transmitting, responsive to the first polling signal, the first stored multiplicity of NSM-packet signals as a first RCN-packet signal;

receiving the transmitted first RCN-packet signal at the intermediate data terminal;

polling the second remote cell node, from the intermediate data terminal, using a second polling signal;

transmitting, responsive to the second polling signal, the second stored multiplicity of NSM-packet signals as a second RCN-packet signal;

receiving the transmitted second RCN-packet signal at the intermediate data terminal;

decoding, at the intermediate data terminal, the first RCN-packet signal as a first plurality of NSM data;

decoding, at the intermediate data terminal, the second RCN-packet signal as a second plurality of NSM data;

identifying redundant NSM data; and deleting the redundant NSM data.

152. The method as set forth in claim 148 or 151 wherein the step of identifying redundant NSM data includes the step of comparing the first plurality of NSM data to the second plurality of NSM data.

153. The method as set forth in claim 151 further comprising, after the step of transmitting the first RCN-packet signal, the steps of:

monitoring, by the second remote cell node, the transmitted first RCN-packet signal;

identifying redundant NSM data; and cancelling redundant NSM data.

154. A method for collecting network service module (NSM) data generated by a plurality of physical devices coupled to a plurality of network service modules, respectively, located within a geographic area, by at least two remote cell nodes located within the geographic area, for transferring the NSM data to a central data terminal (CDT), and for eliminating redundant NSM data, comprising the steps of:

transmitting by wireless radio respective NSM data, generated by a respective physical device using a respective network service module, as an NSM-packet signal;

receiving by a first remote cell node (RCN) the NSM-packet signal;

receiving by a second remote cell node (RCN) the NSM-packet signal;

storing, at the first remote cell node, the NSM-packet signal as part of a first stored multiplicity of NSM-packet signals;

storing, at the second remote cell node, the NSM-packet signal as part of a second stored multiplicity of NSM-packet signals;

polling the first remote cell node, from the central data terminal, using a first polling signal;

transmitting, responsive to the first polling signal, the first stored multiplicity of NSM-packet signals as a first RCN-packet signal;

eavesdropping, by the second remote cell node, to the transmitted first RCN-packet signal;

receiving the transmitted first RCN-packet signal at the central data terminal;

sending, responsive to receiving the transmitted first RCN-packet signal, an acknowledgement signal to the first remote cell node;

eavesdropping, by the second remote cell node, to the transmitted acknowledgement signal;

deleting, at the second remote cell node, the NSM-packet signal from the second stored multiplicity of NSM-packet signals;

polling the second remote cell node, from the central data terminal, using a second polling signal;

transmitting, responsive to the second polling signal, the second stored multiplicity of NSM-packet signals as a second RCN-packet signal;

receiving the transmitted second RCN-packet signal at the central data terminal; and sending, responsive to receiving the transmitted second RCN-packet signal, an acknowledgement signal to the second remote cell node.

155. The method as set forth in claim 154 further comprising the steps of:

decoding, at the central data terminal, the first RCN-packet signal as a first plurality of NSM data;

decoding, at the central data terminal, the second RCN-packet signal as a second plurality of NSM data; and deleting redundant NSM data.

156. A method for collecting network service module (NSM) data generated by a plurality of physical devices coupled to a plurality of network service modules, respectively, located within a geographic area, by at least two remote cell nodes located within the geographic area, for transferring NSM data to at least one central data terminal (CDT), and for eliminating redundant NSM data, comprising the steps of:

transmitting by wireless radio respective NSM data, generated by a respective physical device using a respective network service module, as an NSM-packet signal;

receiving by a first remote cell node (RCN) the NSM-packet signal;

receiving by a second remote cell node (RCN) the NSM-packet signal;

storing, at the first remote cell node, the NSM-packet signal as part of a first stored multiplicity of NSM-packet signals;

storing, at the second remote cell node, the NSM-packet signal as part of a second stored multiplicity of NSM-packet signals;

polling the first remote cell node, from the central data terminal, using a first polling signal;

transmitting, responsive to the first polling signal, the first stored multiplicity of NSM-packet signals as a first RCN-packet signal;

receiving the transmitted first RCN-packet signal at the central data terminal;

polling the second remote cell node, from the central data terminal, using a second polling signal;

transmitting, responsive to the second polling signal, the second stored multiplicity of NSM-packet signals as a second RCN-packet signal;

receiving the transmitted second RCN-packet signal at the central data terminal;

decoding, at the central data terminal, the first RCN-packet signal as a first plurality of NSM data;

decoding, at the central data terminal, the second RCN-packet signal as a second plurality of NSM data; and deleting the redundant NSM data.

157. The method as set forth in claim 155 or 156 wherein the step of identifying redundant NSM data includes the step of comparing the first plurality of NSM data to the second plurality of NSM data.

158. The method as set forth in claim 156 further comprising, after the step of transmitting the first RCN-packet signal, the steps monitoring, by the second remote cell node, the transmitted first RCN-packet signal;

identifying redundant NSM data; and cancelling redundant NSM data.

159. The method as set forth in claim 153 or 158 wherein the step of identifying redundant NSM data includes the step of comparing the transmitted first RCN-packet signal to NSM-data stored at the second remote cell node.

\* \* \* \* \*

UNITED STATES PATENT AND TRADEMARK OFFICE
CERTIFICATE OF CORRECTION

PATENT NO. : 5,553,094
DATED : September 3, 1996
INVENTOR(S) : Dennis F. Johnson, et al.

It is certified that error appears in the above-indentified patent and that said Letters Patent is hereby corrected as shown below:

Column 1, line 37, delete "note" and insert -- noting -- therefore;

Column 2, line 44, after "interference" insert a -- , -- therefore;

Column 3, line 9, after "important" insert -- , -- and after "adopted" insert -- , -- therefore;

Column 4, line 34, delete "receive" and insert -- received -- therefore;

Column 8, line 49, delete "psuedo-random" and insert -- pseudorandom -- therefore;

Column 9, line 22, after the word "transmitters" insert -- , -- therefore;

Column 9, line 40, after 0.3 insert -- sec. -- therefore;

Column 9, line 41, insert -- $P_s = C1 - 2M(T)^N = (1-2.08 \times 10^{-5})^N = (.999979)^N$ -- therefore;

Column 11, line 32, delete "An" and insert -- a -- therefore;

UNITED STATES PATENT AND TRADEMARK OFFICE
CERTIFICATE OF CORRECTION

PATENT NO. : 5,553,094
DATED : September 3, 1996
INVENTOR(S) : Dennis F. Johnson, et al.

It is certified that error appears in the above-indentified patent and that said Letters Patent is hereby corrected as shown below:

Column 13, line 47, after "and" insert -- an -- therefore;

Column 15, line 50, delete "110" and insert -- 112 -- therefore;

Column 15, line 64, after "i.e." insert -- , -- therefore;

Column 16, line 59, delete "radio controlled" and insert -- radio-controlled -- therefore;

Column 16, line 62, after "arrangements" insert -- , -- therefore;

Column 17, line 15, delete "is" therefore;

Column 19, line 4, delete "notes" and insert -- nodes -- therefore;

Column 22, line 51, after "system" insert -- . -- and delete "the" and insert -- The -- therefore;

Column 28, line 48, claim 38, delete "39" and insert -- 37 -- therefore;

UNITED STATES PATENT AND TRADEMARK OFFICE
CERTIFICATE OF CORRECTION

PATENT NO.  : 5,553,094
DATED       : September 3, 1996
INVENTOR(S) : Dennis F. Johnson, et al.

It is certified that error appears in the above-indentified patent and that said Letters Patent is hereby corrected as shown below:

Column 28, line 57, claim 39, delete "signal" and insert -- signals -- therefore;

Column 33, line 3, claim 85, delete "g" and insert -- a -- therefore;

Column 40, line 13, claim 143, delete "140" and insert -- 142 -- therefore;

Column 41, line 8, claim 146, delete the second occurrence of "a" therefore;

Column 44, line 57, claim 158, after the word "steps" insert -- of: -- therefore.

Signed and Sealed this

First Day of April, 1997

Attest:

BRUCE LEHMAN

*Attesting Officer*   Commissioner of Patents and Trademarks